(12) United States Patent
Kato et al.

(10) Patent No.: US 7,030,882 B1
(45) Date of Patent: Apr. 18, 2006

(54) DATA PROCESSING APPARATUS AND PROCESSING METHOD AND MEDIUM FOR ELECTRONIC GAMES

(75) Inventors: Maki Kato, Tokyo (JP); Hiroyuki Chi, Tokyo (JP); Takaya Segawa, Tokyo (JP); Yoshihiro Otani, Tokyo (JP); Hirofumi Murasaki, Tokyo (JP); Koji Aiba, Ashikaga (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/135,024

(22) Filed: Aug. 17, 1998

(30) Foreign Application Priority Data

Sep. 4, 1997 (JP) .................................. 9-240029
Feb. 16, 1998 (JP) ................................. 10-032710

(51) Int. Cl.
*G09G 5/00* (2006.01)

(52) U.S. Cl. ...................... 345/474; 345/473; 345/419; 463/32

(58) Field of Classification Search ................ 345/435, 345/419, 420; 463/32, 33
See application file for complete search history.

(56) References Cited

U.S. PATENT DOCUMENTS

| | | | |
|---|---|---|---|
| 5,563,992 A | 10/1996 | Murata et al. | 395/135 |
| 5,808,624 A | 9/1998 | Ikedo | 345/435 |
| 5,966,137 A * | 10/1999 | Murata | 345/435 |
| 6,241,610 B1 * | 6/2001 | Miyamoto et al. | 463/33 |
| 6,317,130 B1 * | 11/2001 | Ishikawa et al. | 345/473 |
| 6,320,988 B1 * | 11/2001 | Yamaguchi et al. | 382/276 |

FOREIGN PATENT DOCUMENTS

| | | |
|---|---|---|
| JP | 6-348796 | 12/1994 |
| JP | 7-163754 | 6/1995 |
| JP | 8-44898 | 2/1996 |

OTHER PUBLICATIONS

UbiSoft Corporation, Rayman, Company overview, photos, and release information, pp. 1-8.*

(Continued)

*Primary Examiner*—Sumati Lefkowitz
*Assistant Examiner*—Moltilewa Good-Johnson
(74) *Attorney, Agent, or Firm*—Finnegan, Henderson, Farabow, Garrett & Dunner, L.L.P.

(57) ABSTRACT

To provide a data processing apparatus wherewith the work volume required to produce game characters is reduced. The image data processing apparatus is an apparatus for placing a plurality of polygons at predetermined positions, based on position information that places a reference polygon on a screen, applying predetermined texture to the polygons, and thus producing game character data. The game character data 200 comprise distance information and placement angle information for a torso polygon 201, a head polygon 202, wrist polygons 203R and 203L, and ankle polygons 204R and 204L. A processor computes the torso polygon based on placement information for the torso polygon 201 on the screen (processing routine 1), and computes the head polygon 202, wrist polygons 203R and 203L, and ankle polygons 204R and 204L from the distance information and angle information (processing routine 2).

8 Claims, 27 Drawing Sheets

OTHER PUBLICATIONS

Glassner, Andrew S., "The Latest Three-Dimensional Computer Graphics," the first edition, Ascii Corporation (Apr. 1, 1991), pp. 181-182 and 267-268.
Weekly Famitsu, vol. 12, No. 35, Ascii Corporation (Aug. 29, 1997), pp. 24-26.
Saturn Fan, No. 16, Tokumashoten Co., Ltd./IntermMedia Company, "Sega Dynamic Preview," (Aug. 29, 1997), pp. 32-33.
Monthly Game Walker, vol. 4, No. 9, Whole No. 35, Kadokawa Shoten Publishing Co., Ltd. (Sep. 1, 1997), p. 104.
Translation of Japanese Official Action dated Apr. 5, 2000.
Translation of Japanese Official Action dated Nov. 10, 1999.
Translation of Japanese Official Action dated May 26, 1999.

* cited by examiner

| HEAD POLYGON 202 | DISTANCE DATA 202α | ANGLE DATA 202β |
|---|---|---|
| RIGHT WRIST POLYGON 203R | DISTANCE DATA 203Rα | ANGLE DATA 203Rβ |
| LEFT WRIST POLYGON 203L | DISTANCE DATA 203Lα | ANGLE DATA 203Lβ |
| RIGHT ANKLE POLYGON 204R | DISTANCE DATA 204Rα | ANGLE DATA 204Rβ |
| LEFT ANKLE POLYGON 204L | DISTANCE DATA 204Lα | ANGLE DATA 204Lβ |

220

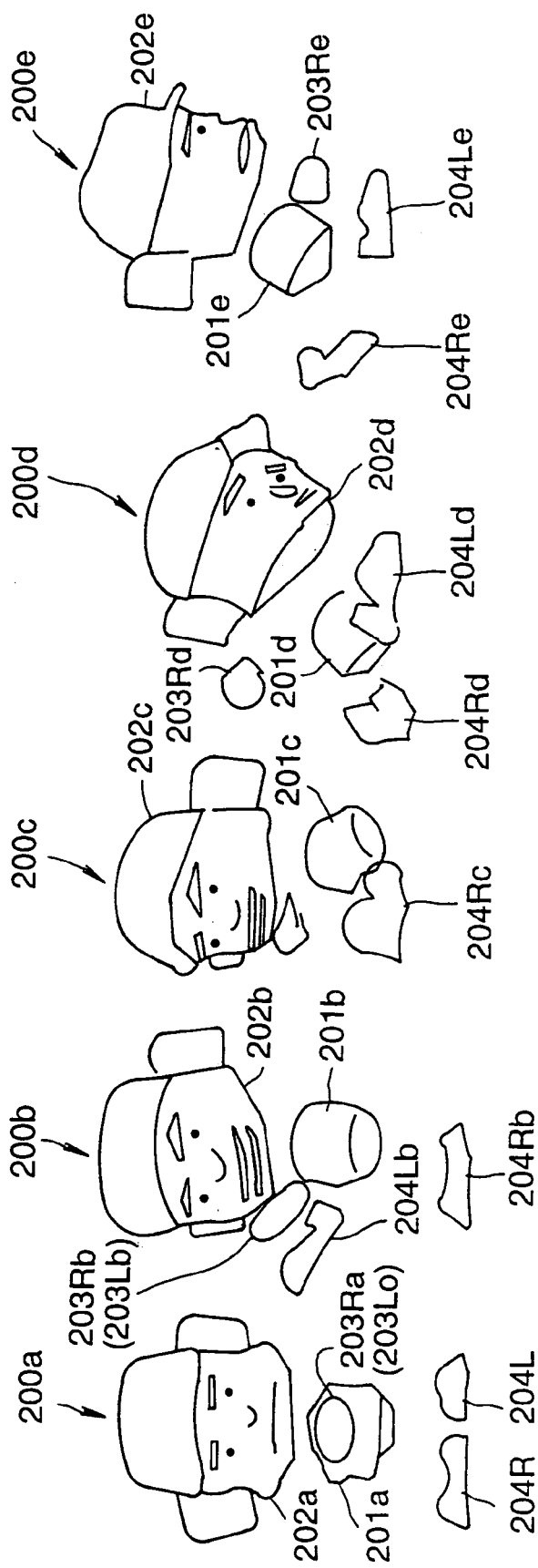

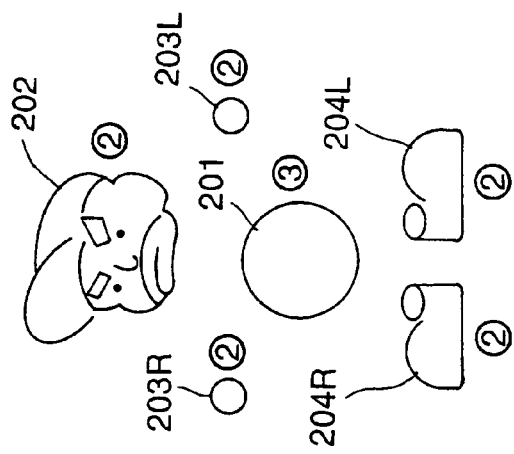
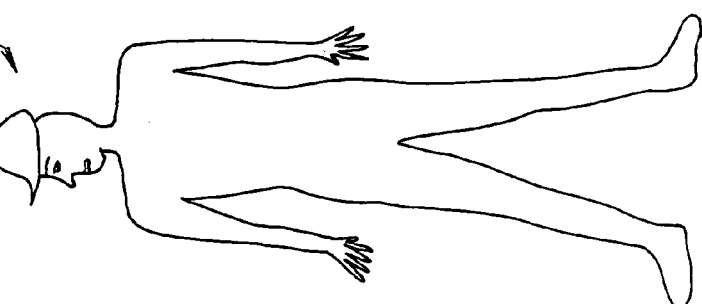
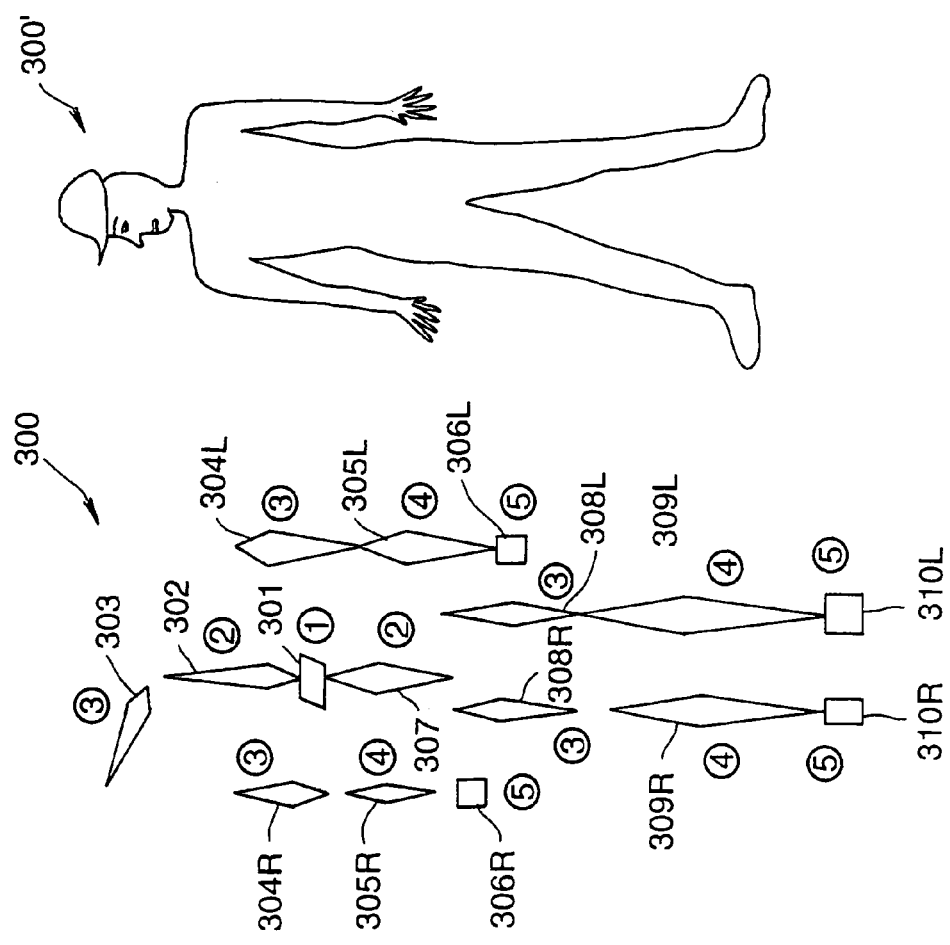
FIG.8(c)
FIG.8(b)
FIG.8(a)

FIG.19

| DRAFT SESSION (MEETING FOR SELECTING NEW PLAYERS) | | |
|---|---|---|
| 1、 GREETING AT BEGINNING OF SESSION | | |
| PD | 001 | WE WILL NOW BEGIN THE DRAFT SESSION TO SELECT NEW PLAYERS FOR THIS YEAR. |
| | | |
| PD | 002 | WE WILL NOW BEGIN THE DRAFT SESSION TO SELECT NEW PLAYERS FOR THE CURRENT YEAR. |
| | | |
| PD | 003 | WE WILL NOW BEGIN THE DRAFT SESSION FOR THIS YEAR. |
| | | |
| PD | 004 | WE WILL NOW BEGIN THE DRAFT SESSION FOR THE CURRENT YEAR. |
| | | |
| 2、 DRAWING RELATED | | |
| MOVE TO DRAWING | | |
| PD | 005 | THIS NAME HAS BEEN SELECTED MORE THAN ONCE, SO WE WILL NOW CONDUCT A DRAWING. |
| | | |
| PD | 006 | (THE NEW PLAYER) HAS BEEN SELECTED BY MORE THAN ONE TEAM, SO WE WILL NOW CONDUCT A DRAWING. |
| | | |
| DRAWING | | |
| PD | 007 | WE NOW CONDUCT THE DRAWING. |

FIG.20

| | 69 | REQUEST COMMENT ON A CERTAIN PLAYER WHEN THERE IS A GOOD SCORING OPPORTUNITY |
|---|---|---|
| NF | 542 | THIS OPPORTUNITY IS MET BY A ROAR FROM THE CROWD IN THE STANDS. |
| | | |
| NF | 543 | THIS PLAYER IS NOW AT BAT WITH A RUNNER IN SCORING POSITION. |
| | | |
| NF | 544 | CLUTCH HITTING IS WANTED HERE. (BATTER'S NAME) |
| | | |
| | 70 | REQUEST COMMENT IN THE SITUATION WHEN THE TEAM IS IN TROUBLE |
| NF | 545 | WE CAN'T RELAX EVEN WITH THIS LARGE LEAD. |
| | | |
| NF | 546 | WE CAN'T LET THIS PITCHER GET INTO A RHYTHM. |
| | | |

DATA PROCESSING APPARATUS AND PROCESSING METHOD AND MEDIUM FOR ELECTRONIC GAMES

BACKGROUND OF THE INVENTION

1. Field of the Invention

This invention concerns a data processing apparatus and processing method for executing image and video data processing, and data recording and playback processing, in a video game or game machine that simulates a ball game such as baseball or soccer, together with a medium on which is recorded a program for implementing such processing on a computer.

2. Description of the Related Art

In conjunction with advances in computer technology, video game machines which employ computer graphics technology have come into wide use. The popularity of such video game machines which simulate ball games such as baseball or soccer is particularly deep-rooted, and many video game machines of this type have been contrived. In this type of game, audio simulating the real environment in a real game is effected as a sound effect during the play of the game. In Pat. No. 2,552,425 (Patent Application No. H5-313705 [1993]), for example, a game machine is disclosed that produces play-by-play broadcasting by recording beforehand play-by-play terminology data that correspond to the progress of the game or the way manipulations are being made therein, designating those play-by-play terminology data that correspond to the progress of the game or the way manipulations are being made therein, and converting them to audio at a listenable speed. In this type of game, moreover, game characters simulating humans are produced, and all kinds of game characters are made to perform in the game. In this type of game, furthermore, the facial expressions of the game characters are made to change in conjunction with the development of the game.

Also, application software for games recorded on a CD-ROM is loaded into the video game machines. In such cases, it was necessary to have leading sector number information for the respective files in such software held in some form or other in memory in the video game machine. In a case where there are 10,000 such audio files on the CD-ROM, for example, when those files are associated in one file, 4 bytes per file, at the very least, are required for the leading sector number information, for which purpose approximately 40 kilobytes of memory must be used.

In the game machine, meanwhile, persons playing the game are specified, or, alternatively, a password is entered in conjunction with the progress of the game.

SUMMARY OF THE INVENTION

In the prior art, the approach taken is to output audio corresponding to certain conditions of game advance and game manipulation, wherefore the conditions and the audio output sustain a one-to-one relationship. For this reason, the dialog is output every time the corresponding condition occurs. This unavoidably leads to monotony, and can even cause the players to tire of the game. Also, in games wherein conditions during the game are explained in terms of play-by-play using audio, if the play-by-play announcer is always the same, that will also unavoidably lead to monotony. In order to avoid such difficulties, the inventors proposed an invention wherewith a box that contains a set of dialogs corresponding to conditions can be prepared, so that a plurality of phraseologies can be prepared even under the same conditions by randomly extracting dialogs, and wherewith a plurality of play-by-play announcers can be selected.

However, due to the fact that there are conditions attached to the dialogs, too much time is required in producing the software, which is a shortcoming.

Conventional game characters, moreover, are made to simulate humans, and therefore have a plurality of articulations, etc., so that too much time is required for modeling, which is also a shortcoming.

In representing facial expressions on game characters, furthermore, the features that make up the face, namely the nose, eyes, eyebrows, and mouth, etc., are not independent, wherefore, when one feature is changed, other features are affected, so that expressive and attractive facial expressions cannot not be represented.

In addition to that, when game application software stored on a CD-ROM is loaded into a video game machine, in cases where there are 10,000 audio files on the CD-ROM, for example, when those files are associated in one file, a minimum of 4 bytes per file are needed for the file leading sector number, for which approximately 40 kilobytes of memory must be used, and this enormous volume of data occupy memory space. This is also a shortcoming.

For the game machine, meanwhile, it is necessary to specify the persons who will play the game, or to enter passwords in conjunction with the progress of the game. These passwords should contain encoded data, but they are fundamentally different from the language naturally used by humans. For this reason, it is difficult to remember these passwords, and so a player frequently enters the wrong password.

Accordingly, it is necessary to verify each character of input against the characters displayed on the screen. In practice, a player conducts a verification operation in which he or she compares the characters displayed on the screen against a password written on paper, involving a shift in his or her line of sight. Such a verification operation as this places a great burden on the player because it involves shifting his or her line of sight between the paper and the screen. This is yet another shortcoming.

An object of the present invention, devised for the purpose of resolving these problems, is to provide a data processing apparatus, processing method therefor, and medium therefor, wherewith variation is imparted to the content of audio generated, game character production work volume is reduced, and colorful facial expressions can be represented, thereby preventing games from becoming monotonous and players from becoming bored.

Another object of the present invention is to provide a data processing apparatus, processing method therefor, and medium therefor, wherewith, when reading large volumes of data from a CD-ROM, the amount of memory in the main unit used for the reading process is reduced.

Another object of the present invention is to provide a data processing apparatus wherewith the burden on a player in verifying the content of input information is reduced.

A first aspect of the present invention, for the purpose of achieving the objects noted above, is an image processing apparatus for placing into predetermined positions multiple polygons, based on position information that places a reference polygon on a screen, and for mapping predetermined texture onto the polygons, wherein a game character comprises: the reference polygon; and component polygons that do not have articulating components relative thereto; and comprising a processor for computing the reference polygon based on the position information for the reference polygon on the screen, and computing the component polygons for the reference polygon.

A second aspect of the present invention is an image processing apparatus for placing into predetermined positions multiple polygons, based on position information that places a reference polygon on a screen, and for applying predetermined texture onto the polygons and producing game characters, wherein features configuring game character expressions are made up of multiple polygons provided with position data from a reference point; and comprising a processor for executing predetermined image processing, when altering facial expressions, only on polygons of features corresponding to the altered expressions.

The processor noted here is capable of performing image processing independently on the polygons, rotating them, enlarging them, reducing them, or moving them.

A third aspect of the present invention is a data processing apparatus for reading files from a storage medium, wherein: files comprising a plurality of sectors are recorded on the storage medium; read-out information on the next file is written into a designated sector in each file; and the processor comprises means for reading those files based on the read-out information written to the predetermined sectors.

The processor here may be configured so that it determines the length of the file it is currently reading out, up to the next file, from read-out information stored in a predetermined sector in the file currently being read, and reads out sectors according to the results of that determination, thereby reading that file from the storage medium.

Alternatively, the processor may be configured so that it takes in the designated sector of the file it is reading and computes the data length to the next file, makes a comparison against a value counted by reading in the current file data sector by sector, and terminates the reading of the current file when the two values coincide.

Alternatively, the processor may be configured so that it takes in the designated sector of the file it is reading and holds the leading sector number of the next file, compares this held sector number against a sector number arrived at by sequentially reading in sectors of the current file, and terminates the reading of the current file when the two numbers coincide.

Alternatively, the processor may be configured so that it takes in the designated sector of the file it is reading and holds the number of sectors making up the file, compares this held number of sectors against a number counted by sequentially reading in the sectors of the current file, and terminates the reading of the current file when the two numbers coincide.

It is preferable, here, that the read-out information be written to the leading sector of the current file.

A fourth aspect of the present invention is a data processing apparatus comprising: a processor for storing a plurality of dialogs corresponding, respectively, to a plurality of predetermined situations, monitoring the progress of the game, and, when a predetermined situation occurs, selecting and outputting corresponding dialogs from the stored dialogs; an audio output apparatus for taking the dialog data from the processor, converting them to audio signals, and outputting audio; scene boxes to which are written various kinds of scene conditions conceivable for the predetermined situations, when they occur; and text boxes in which are stored dialog numbers applicable to scenes corresponding, respectively, to the conditions in the scene boxes; wherein the processor monitors the progress of the game, acquiring predetermined conditions, uses those conditions to make scene box condition judgments and selects the proper text boxes, selects dialog numbers by random selection instructions from the text box, and sends those numbers to the audio output apparatus.

A fifth aspect of the present invention, in order to achieve the objects noted earlier, is a data processing apparatus comprising: display means; sound playback means; and a game machine main unit for sending screens to be displayed on the display means and supplying sound signals; wherein: the game machine main unit displays character strings of text characters, numbers, and symbols, etc., and comprises means for sending the sound signals for the text characters of the character strings one character at a time to the sound playback means.

The configuration here is made such that, when inputting a character string, the display means can be made to display the input characters, and the input text characters can be played back as audio from the sound playback means.

Another characteristic is that the stored character strings are displayed on the display means, and the characters in the character strings are played back as audio, character by character, from the sound playback means.

A sixth aspect of the present invention is a medium on which is stored a program for causing a computer to function as a processor and data system as discussed above.

The medium may be, for example, a floppy disk, hard disk, magnetic tape, magneto-optical disk, CD-ROM, DVD, ROM cartridge, battery-backed-up RAM memory cartridge, flash memory cartridge, or non-volatile RAM card, etc. The medium may also be a communications medium such as a land wire communications medium such as a telephone line or a radio communications medium such as a microwave channel. The internet is also comprehended among the communications media in view here. By medium is meant anything wherewith information (mainly digital data and programs) can be recorded by some physical means or other, and which can cause a computer, dedicated processor, or other processing device to perform the predetermined functions. In other words, the medium need only be something that, by whatever means, can download programs to a computer and cause the predetermined functions to be performed.

BRIEF DESCRIPTION OF THE DRAWINGS

FIG. 7 is an explanatory diagram representing an example of movement-induced changes in a game character in the first embodiment of the present invention;

FIG. 8 is a diagram for explaining a comparison between processing in the first embodiment of the present invention and game character processing wherein this embodiment is not applied;

FIG. 19 is an explanatory diagram representing dialog numbers and some of the dialog content in text boxes in the fourth embodiment of the present invention;

FIG. 20 is an explanatory diagram representing dialog numbers and some of the dialog content in text boxes in the fourth embodiment of the present invention;

DESCRIPTION OF THE PREFERRED EMBODIMENTS

The present invention, basically, is a game wherein a player becomes the owner of a baseball team and develops the team. The chain of processes pertaining to image data, sound data, and playback from a CD-ROM, etc., during the progress of the game, is divided into and described in terms of the embodiments noted below. In this game, foremost, the image processing for producing game characters is described in terms of a first embodiment, the processing for producing facial expressions on the game characters is described in a second embodiment, the processing for playing back data from a CD-ROM is described in terms of a third embodiment, and the processing for playing back sound data is described in terms of a fourth embodiment.

The first embodiment is now described.

In describing the first embodiment of the present invention, we begin with a description of the configuration of an apparatus for implementing processing to produce game characters that consist of image data.

Figure 1:
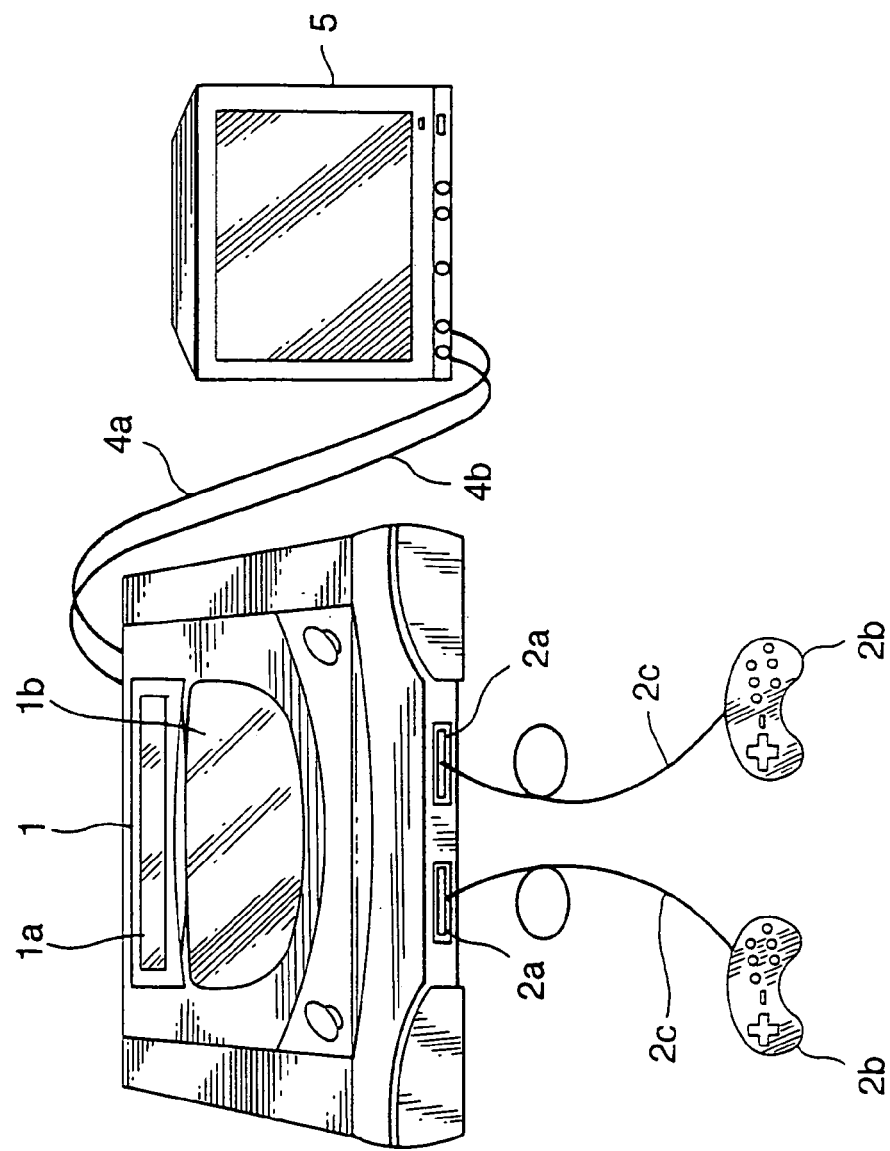
FIG. 1 is an external view of a video game machine to which a first embodiment of the present invention pertains.

FIG. 1 depicts the exterior of a video game machine wherein the data processing apparatus is applied to which this first embodiment of the present invention pertains. In this figure, a video game machine main unit 1 is shaped roughly as a box, inside of which are provided game processing boards and so forth. Two connectors 2a are provided at the front of the video game machine main unit 1. To these connectors 2a are connected game control pads 2b via cables 2c. Two pads 2b are used when two players wish to enjoy the baseball game, etc.

In the top part of the video game machine main unit 1 are provided a cartridge interface 1a for connecting a ROM cartridge, and a CD-ROM drive 1b for reading a CD-ROM. At the back of the video game machine main unit 1 are provided a video output terminal and audio output terminal (not shown in the figure). The video output terminal is connected to the video input terminal of a TV receiver 5 through a cable 4a, while the audio output terminal is connected to the audio input terminal of the TV receiver 5 through a cable 4b. In such a video game machine as this, a user can play the game by manipulating a pad 2b while watching the picture shown on the TV receiver 5.

Figure 2:
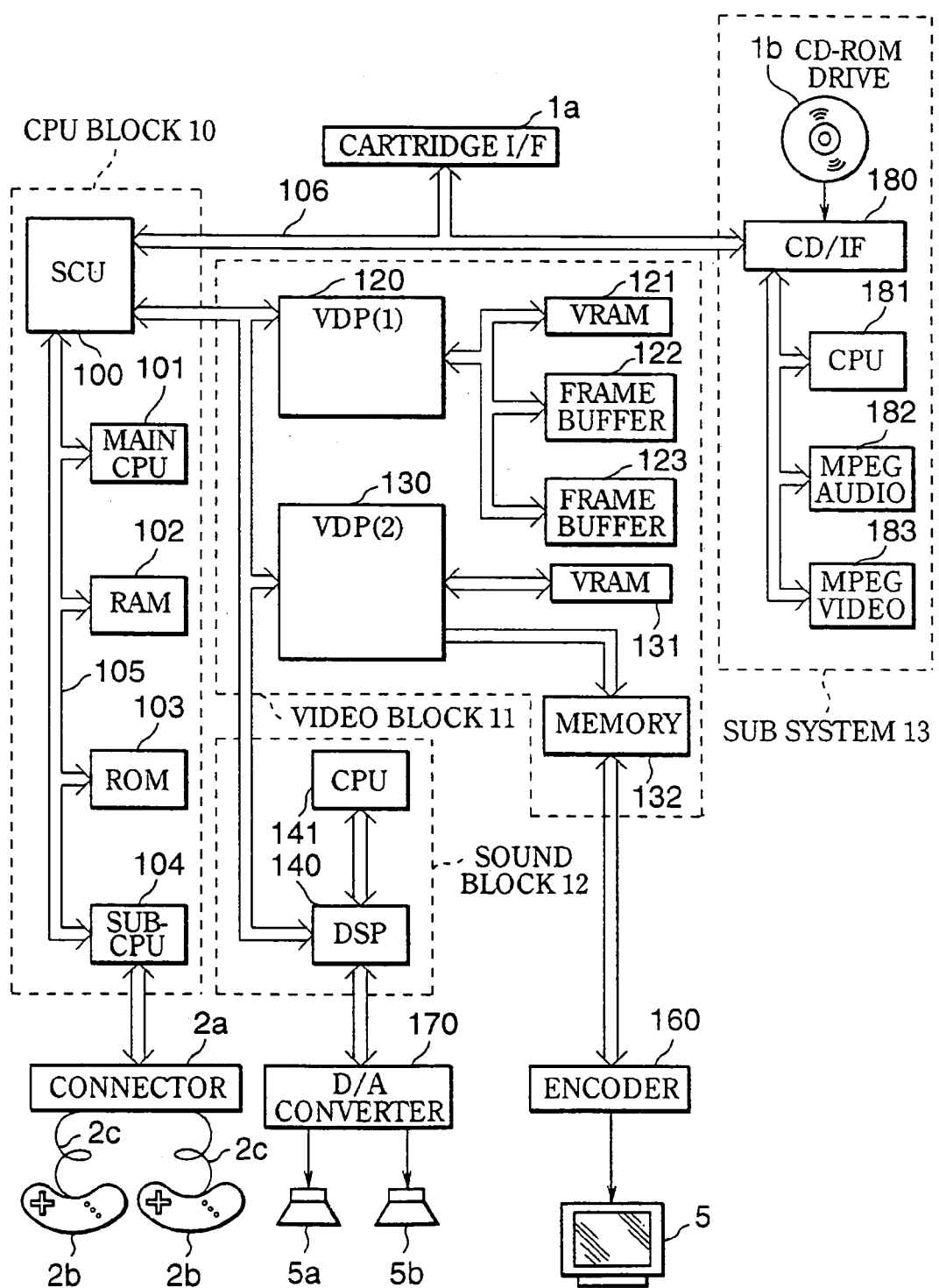
FIG. 2 is a simplified block diagram of the video game machine to which the first embodiment of the present invention pertains.

FIG. 2 is a block diagram that represents a summary of the game machine when the data processing apparatus to which this embodiment pertains is applied to a TV game device. This image processing apparatus comprises a CPU block 10 for controlling the entire apparatus, a video block 11 for controlling the display of game screens, a sound block 12 for generating sound effects, etc., and a subsystem 13 for reading out from the CD-ROM. The CPU block 10 comprises an SCU (system control unit) 100, main CPU 101, RAM 102, ROM 103, cartridge interface 1a, sub-CPU 104, and CPU bus 105, etc.

The main CPU 101 controls the overall apparatus. This main CPU 101 features internal operational functions that are the same as a DSP (digital signal processor), and is capable of running application software at high speed. The RAM 102 is used by the main CPU 101 as a work area. In the ROM 103 is written an initial program for initializing. The SCU 100 controls the buses 105, 106, and 107, and thereby conducts data input and output smoothly between the main CPU 101, VDPs 120 and 130, DSP 140, and CPU 141. The SCU 100 also is provided with an internal DMA controller and is capable of transferring sprite data to the VRAMs in the video block 11 during games. By these means it is possible to run application software such as games at high speed. The cartridge interface 1a is provided for inputting application software supplied in the form of ROM cartridges. The sub-CPU 104 is a system manager and peripheral controller (SMPC), and functions, when so requested from the main CPU 101, to collect peripheral data from the pads 2b via the connectors 2a. The main CPU 101 performs such processing, based on the peripheral data received from the sub-CPU 104, as moving ballplayers on the game screen, etc. To the connectors 2a can be connected various peripherals such as a pad, joystick, or keyboard. The sub-CPU 104 automatically recognizes what type of peripherals are connected to the connectors 2a (main unit terminals), and functions to collect peripheral data, etc., by a communication format matched to the peripheral type.

The video block 11 comprises the VDP (video display processor) 120 for portraying video game characters, etc., made up of polygons, and the VDP 130 for drawing background screens and synthesizing and clipping polygon image data and background images. The VDP 120 is connected to a VRAM 121 and frame buffers 122 and 123. Polygon drawing data for representing game characters in the video game machine are sent from the main CPU 101 via the SCU 100 to the VDP 120, and are written to the VRAM 121. The drawing data written to the VRAM 121 are drawn in the frame buffer 122 or 123 in either a 16-bit/pixel or 8-bit/pixel format. The data drawn in the frame buffer 122 or 123 are sent to the VDP 130. Information for controlling the drawing are sent from the main CPU 101 via the SCU 100 to the VDP 120. The VDP 120 executes drawing processing according to these instructions.

The VDP 130 is connected to a VRAM 131 and is configured so that image data output from the VDP 130 is output to an encoder 160 via a memory 132. The encoder 160 generates video signals by adding a synchronous signal, etc., to the image data, which it outputs to the TV receiver 5. Thus the scenes of a baseball game are displayed on the TV receiver 5.

The sound block 12 comprises the DSP 140 which performs audio synthesis following a PCM or FM format, and the CPU 141 which, among other things, controls the DSP 140. Audio data generated by the DSP 140 are converted to 2-channel signals by a D/A converter 170 and output to a speaker 5b. The subsystem 13 comprises the CD-ROM drive 1b, CD-interface 180, CPU 181, MPEG-AUDIO 182, and MPEG-VIDEO 183, etc. This subsystem 13 has functions for reading application software supplied in CD-ROM format and for playing back moving images, etc. The CD-ROM drive 1b reads data from the CD-ROM. The CPU 181 controls the CD-ROM drive 1b and performs processing to correct errors in data that are read. The data read out from the CD-ROM are sent via the CD-interface 180, bus 106, and SCU 100 to the main CPU 101, and used as application software. The MPEG-AUDIO 182 and MPEG-VIDEO 183 are devices which restore data that have been compressed according to the MPEG (Motion Picture Expert Group) standard. By restoring the MPEG compressed data written to CD-ROM, using the MPEG-AUDIO 182 and MPEG-VIDEO 183, it is possible to play back moving images. Game character production processing will now be described.

Figure 3B:
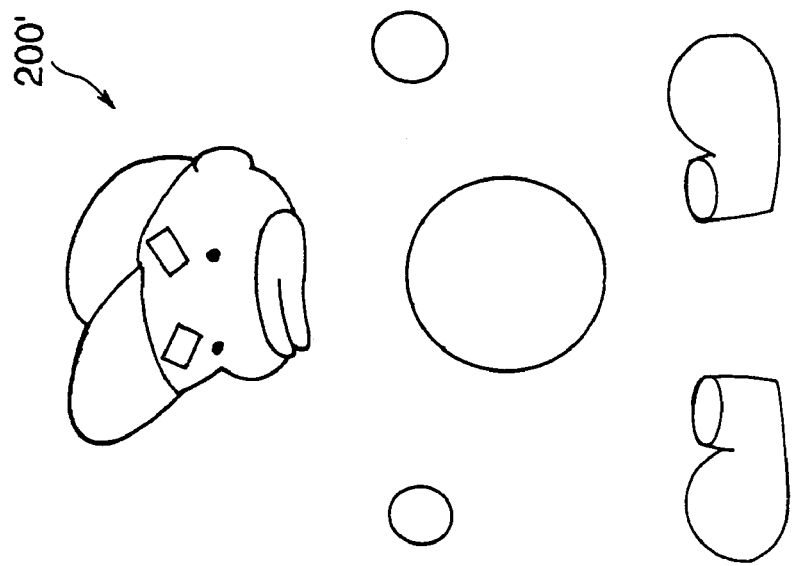
FIG. 3 is a conceptual diagram representing the basic configuration of game characters in the first embodiment of the present invention.
Figure 3A:
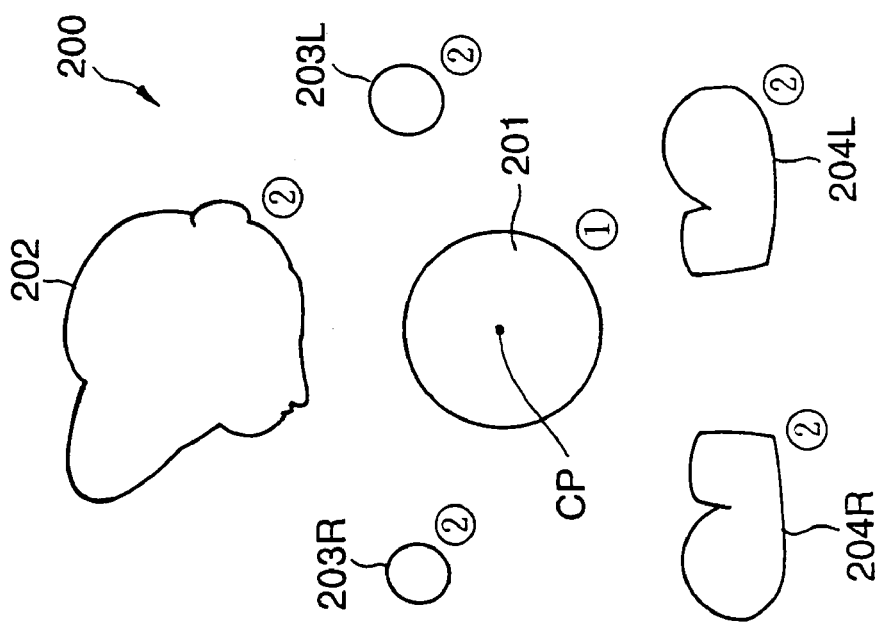

FIG. 3 is a diagram that pertains to the game characters used in the first embodiment. FIG. 3(a) represents example character configuring elements, while FIG. 3(b) represents an example character displayed on a TV receiver or the like. In the character data 200 depicted in this figure, a number of elements are effected, namely a center point CP for determining the position that the game character will occupy on the screen, a torso polygon (reference polygon) 201 derived by a first computation routine from the center point CP, a head polygon 202 above the torso polygon 201 derived by a second computation routine centered on the torso polygon 201, wrist polygons 203R and 203L at predetermined positions at the upper right and left of the torso polygon 201, and ankle polygons 204R and 204L at predetermined positions at the lower right and left of the torso polygon 201. Here, polygons other than the torso polygon correspond to component polygons.

Between the torso polygon and component polygons there are no other polygons (upper arm, lower arm, thigh, and lower leg, etc.) for forming articulations.

Figures 4, 5:
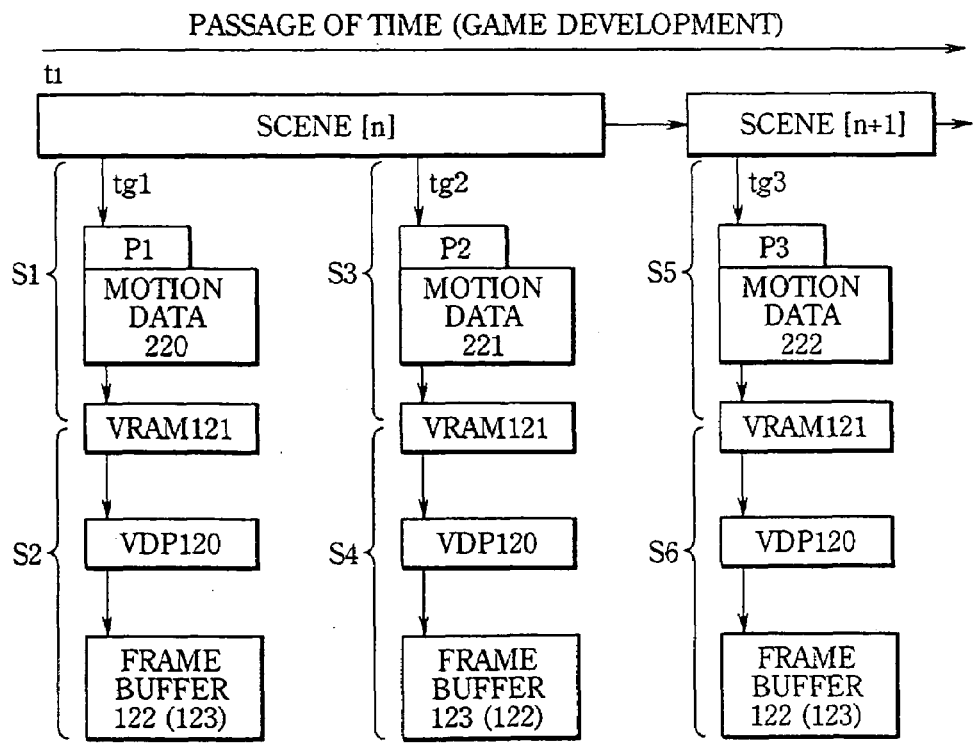
FIG. 4 is a conceptual diagram representing the configuration of motion data in the first embodiment of the present invention.
FIG. 5 is a conceptual diagram representing the basic processing concept for the first embodiment of the present invention.

The requisite display data are formed by subjecting these polygons 201 through 204R and 204L to predetermined computations and placing them in predetermined positions, and applying texture to the polygons 201 through 204R and 204L, respectively, so positioned, thus forming a game character 200', such as depicted in FIG. 3(b), that is displayed on the TV receiver 5. FIG. 4 gives, in summary form, a motion data table necessary for producing the game characters in the first embodiment. In the motion data table 220 shown in this figure, the head polygon 202 data comprise distance data 202α representing the distance from the torso polygon 201 and angle data 202β therefor; the wrist polygon 203R and 203L data comprise distance data 203Rα and 203Lα representing distances from the torso polygon 201 and angle data 203Rβ and 203Lβ therefor; and the ankle polygon 204R and 204L data comprise distance data 204Rα and 204Lα representing distances from the torso polygon 201 and angle data 204Rβ and 204Lβ therefor.

Figure 6:
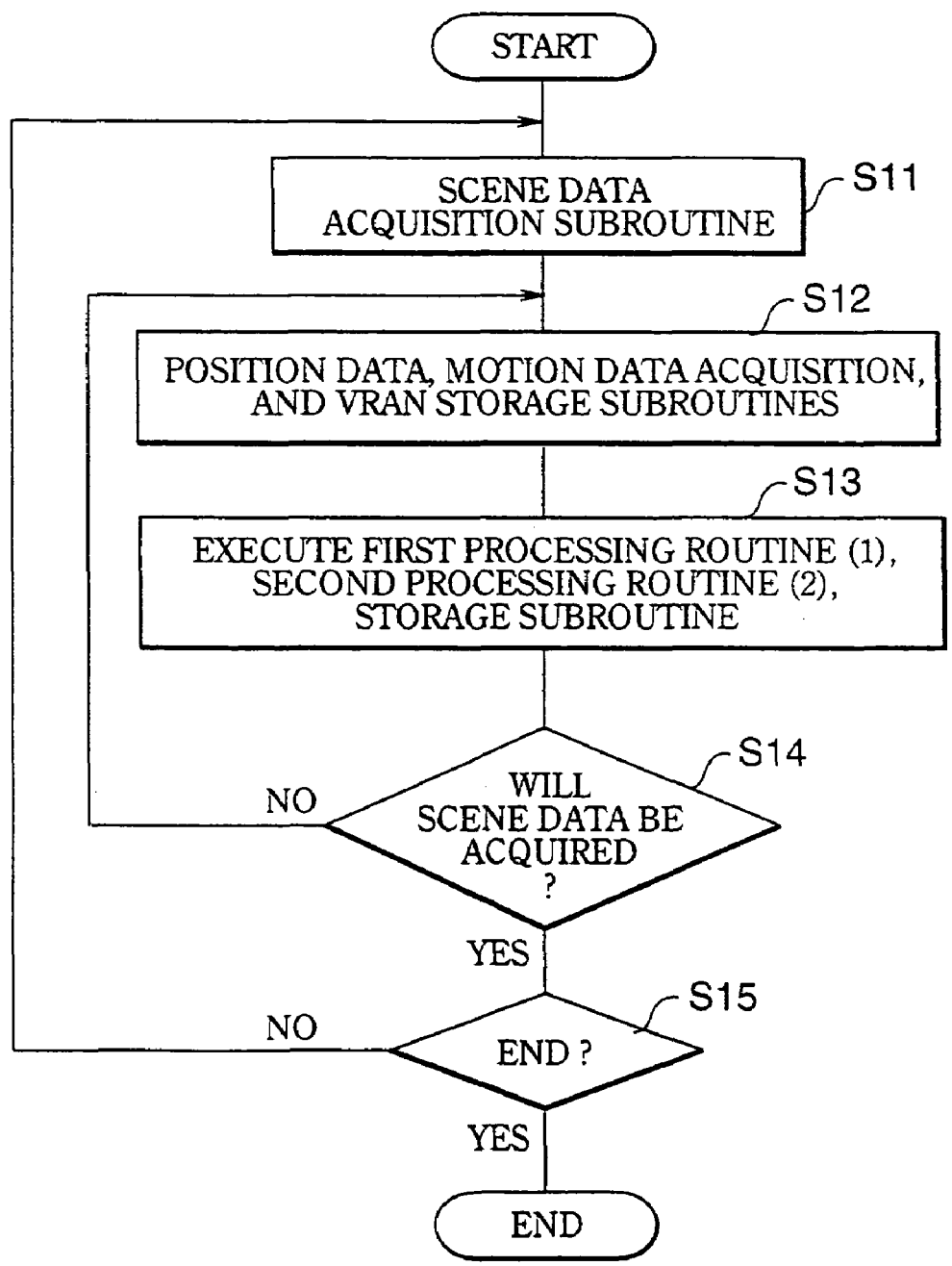
FIG. 6 is a flowchart for shape processing in the first embodiment of the present invention.

FIG. 5 is a diagram provided for giving a summary description of the first embodiment. This figure, wherein the passage of time (game flow) is represented by the horizontal axis, is intended for describing scenes, motion data table, and game character production routines with the passage of time. FIG. 6 is a flowchart for describing the action of this first embodiment.

Let it now be assumed that the game has been started, that some time has elapsed, that some scene has been reached, and that some command has been input from a pad 2b via the sub-CPU 104. Thereupon, the main CPU 101, in conjunction with the progress of the game, at time t1, accesses the n'th scene data 210 from the subsystem 13 (step S1 in FIG. 5; step S11 in FIG. 6).

The main CPU 101, based on the commands from the pad 2b and on the current scene data 210, at trigger time tg1, takes position data P1 for the position of the game character data 200 on the screen, and motion data 220, and sends these data via the VDP 210 to the VRAM 121.

The VDP 120, based on the screen position data P1 for the game character data 200 stored in the VRAM 121, determines the center point CP position for the torso polygon 201 (cf. FIG. 3(a)), and, based on the motion data 220, computes the torso polygon 201 from the center point position of the torso polygon 201 in a first processing routine 1, as indicated in FIG. 3(a). Following this, in a second routine 2, the VDP 120 computes the head polygon 202, the wrist polygons 203R and 203L, and the ankle polygons 204R and 204L, and stores these in either frame buffer 122 or frame buffer 123 (step S3 in FIG. 5; step S13 in FIG. 6).

A determination is made again as to whether this is the initial scene data access (step S14). Here, since the n'th scene data 210 have already been accessed (step S14: No), the main CPU 101 does not access scene data from the subsystem 13, but moves to the routine in step 12.

Next, the main CPU 101, based on instructions from the pad 2b and the n'th scene 210, at the trigger time tg2, sends the position data P2 for the position of the game character 200 on the screen and the motion data 221 via the VDP 120 to the VRAM 121 for storage (step S4 in FIG. 5; step S12 in FIG. 6).

The VDP 120, based on the game character 200 screen position data P2 stored in the VRAM 121, determines the center point CP position for the torso polygon 201 (cf. FIG. 3(a)), and, based on the motion data 221, computes the torso polygon 201 from the center point CP position of the torso polygon 201 in a first processing routine 1, as indicated in FIG. 3(a).

Following this, in a second routine 2, the VDP 120 computes the head polygon 202, the wrist polygons 203R and 203L, and the ankle polygons 204R and 204L, and stores these in either frame buffer 123 or frame buffer 122 (step S5 in FIG. 5; step S13 in FIG. 6).

The main CPU 101, furthermore, in conjunction with the progress of the game (step S14: Yes; step S15: No), at time t2, accesses the n+1'th scene data 211 from the subsystem 13 (step S7 in FIG. 5; step S11 in FIG. 6).

The main CPU 101, furthermore, based on commands from the pad 2b and the current scene data 211, at the trigger time tg3, sends position data P3 for the game character data 200 positioned on the screen and the motion data 222 via the VDP 120 to the VRAM 121 for storage (step S7 in FIG. 5; step S12 in FIG. 6). The VDP 120, based on the screen position data P3 stored in the VRAM 121 for the game character data 200, determines the center point CP position for the torso polygon 201 (cf. FIG. 3(a)), and, based on the motion data 220, as depicted in FIG. 3(a), computes the torso polygon 201 from the center point CP position of the torso polygon 201 in the first routine 1. Following this, in a second routine 2, the VDP 120 computes the head polygon 202, the wrist polygons 203R and 203L, and the ankle polygons 204R and 204L, and stores these in either frame buffer 122 or frame buffer 123 (step S3 in FIG. 5; step S13 in FIG. 6).

In this manner, with the passage of time, processing is done by the VDP 120 for each trigger time tg1, tg2, tg3, etc., whereby are obtained polygons for the torso polygon 201, head polygon 202, wrist polygons 203R and 203L, and ankle polygons 204R and 204L. The VDP 120 also applies texture to the polygons, suited to each polygon. Thus is formed the game character 200' as depicted in FIG. 3(b).

In this manner, with the passage of time, polygons are computed at each of the trigger times tg1, tg2, tg3, tg4, tg5, etc., for the torso polygon 201, head polygon 202, wrist polygons 203R and 203L, and ankle polygons 204R and 204L, and texture is applied to each polygon, whereupon the completed game character is stored in the frame buffers 122 and 123, and are sent via the VDP 130 to the VRAM 131 for storage.

FIG. 7 is an explanatory diagram representing example changes in a game character resulting from the action of the first embodiment. At (a) through (e) in FIG. 7 are depicted game character data 200a through 200e at the respective trigger times. In this figure, the game character data 200a, 200b, 200c, 200d, and 200e, etc., obtained at the trigger times tg1, tg2, tg3, tg4, tg5, etc., in the diagram, represent motion, as indicated at (a), (b), (c), (d), (e), etc., in FIG. 7.

More specifically, in FIG. 7(a), the game character data 200a face the front, with both wrist polygons 203Rα and 203Lα joined together in front of the torso polygon 201a, the right ankle polygon 204Ra facing the front, and the left ankle polygon 204La opened to the right side.

In FIG. 7(b), the game character data 200b face the front, with the two wrist polygons 203Rb and 203Lb positioned to the upper left of the torso polygon 201b, the right ankle polygon 204Rb raised up on the right side of the torso polygon 201b, and the left ankle polygon 204Lb opened to the right side. In FIG. 7(c), the game character data 200c continue to face the front, while the torso polygon 201c is shifted downward, the right ankle polygon 204Rc is shifted downward from the middle of the torso polygon 201c, and the left ankle polygon 204Lc is opened to the right side.

In FIG. 7(d), the game character data 200d are facing left, while the torso polygon 201d is turned to the left, the head polygon 202d is turned to the left, the right wrist polygon 203Rd is positioned behind the head polygon 202d, the right ankle polygon 204Rd is shifted down in front of the torso polygon 201d, and the left ankle polygon 204Ld is slightly elevated.

In FIG. 7(e), the game character data 200e face all the way around to the left, while the torso polygon 201e has finished turning, the head polygon 202e is also facing the left side, the right wrist polygon 203Re is positioned in front of the torso polygon 201e, the right ankle polygon 204Rb is positioned down in front of the torso polygon 201e, facing the left side, and the left ankle polygon 204Lb is slightly elevated behind the torso polygon 201e. This form wherein the shape of the game character data 200a through 200e changes in FIG. 7(a) through (e) simulates the pitching form of a pitcher in a baseball game. When these game character data 200a, 200b, 200c, 200d, 200e, etc., are sent with the predetermined display timing in a stream to the TV receiver 5, the motion of a pitcher making a pitch is displayed on the screen of the TV receiver 5. FIG. 8 is a diagram provided for comparing processing in this first embodiment with (conventional) game character processing in which this embodiment is not applied. FIG. 8(a) is a diagram for explaining a conventional game character polygon computation example. FIG. 8(b) is a diagram depicting a conventional game character polygon with texture applied. FIG. 8(c) is a diagram for describing an example computation in this first embodiment.

A game character 300 wherein this embodiment is not applied, as diagrammed in FIG. 8(a), has a lower torso polygon 301 positioned in the center, a chest polygon 302 positioned so as to be oriented upward from the lower torso polygon 301, a head polygon 303 positioned above the chest polygon 302, upper arm polygons 304R and 304L, lower arm polygons 305R and 305L, and wrist polygons 306R and 306L positioned appropriately, a buttocks polygon 307 positioned so as to be oriented down from the lower torso polygon 301, and, farther below the buttocks polygon 307, thigh polygons 308R and 308L, shin polygons 309R and 309L, and ankle polygons 310R and 310L. When texture has been applied to these polygons 301 through 310R and 310L, the game character 300' depicted in FIG. 8(b) is configured.

Now, in conjunction with the progress of the game, the VDP 120, using data received from the main CPU 101, places the center of the lower torso polygon 301 of the predetermined game character 300 at the predetermined position on the screen, and computes the lower torso polygon 301 from this center (routine 1); computes, on the basis of those results, the chest polygon 302 (routine 2); computes, on the basis of the results of the computation for the chest polygon 302, the head polygon 303 and upper arm polygons 304R and 304L (routine 3); computes, on the basis of the results of the computation for the upper arm polygons 304R and 304L, the lower arm polygons 305R and 305L (routine 4); and, finally, on the basis of the results of the computation for the lower arm polygons 305R and 305L, computes the wrist polygons 306R and 306L (routine 5).

Similarly, the VDP 120, when the computation for the lower torso polygon 301 is completed (routine 1), computes, on the basis of those computations results, the buttocks polygon 307 (routine 2); computes, on the basis of the results of the computation for the buttocks polygon 307, the thigh polygons 308R and 308L (routine 3); computes, based on those computation results, the shin polygons 309R and 309L (routine 4); and, finally, based on the results of the computations for the shin polygons 309R and 309L, computes the ankle polygons 310R and 310L (routine 5). All of these process routines are necessary.

In contrast thereto, with the first embodiment of the present invention, the VDP 120, after determining the center of the body polygon 201 in accordance with the progress of the game, computes the body polygon 201 (routine 1), as diagrammed in FIG. 8(c), and then, based on the motion data, computes the head polygon 202, wrist polygons 203R and 203L, and the ankle polygons 204R and 204L, placed at predetermined positions away from the body polygon 201 (routine 2). The motion data contain, in addition to distance data from the body data 201 for each polygon, angels for each of the polygons, so that the polygons are positioned according to their respective angles. Accordingly, whereas with conventional image processing it required processing routines 1 through 5 to compute the polygons, with the first embodiment of the present invention, this processing is done with only routines 1 and 2, so that the number of computation process steps can be sharply reduced. It is also possible to reduce the number of polygons required to display a game character. With the first embodiment of the present invention, moreover, the head polygon 202, wrist polygons 203R and 203L, and the ankle polygons 204R and 204L are positioned at some distance away from the body polygon 201, so that no articulations exist between the body polygon 201, on the one hand, and the head polygon 202, wrist polygons 203R and 203L, and ankle polygons 204R and 204L, on the other. Therefore, the head polygon 202, wrist polygons 203R and 203L, and ankle polygons 204R and 204L can be freely extended away from out brought in closer to the body polygon 201.

Figure 9:
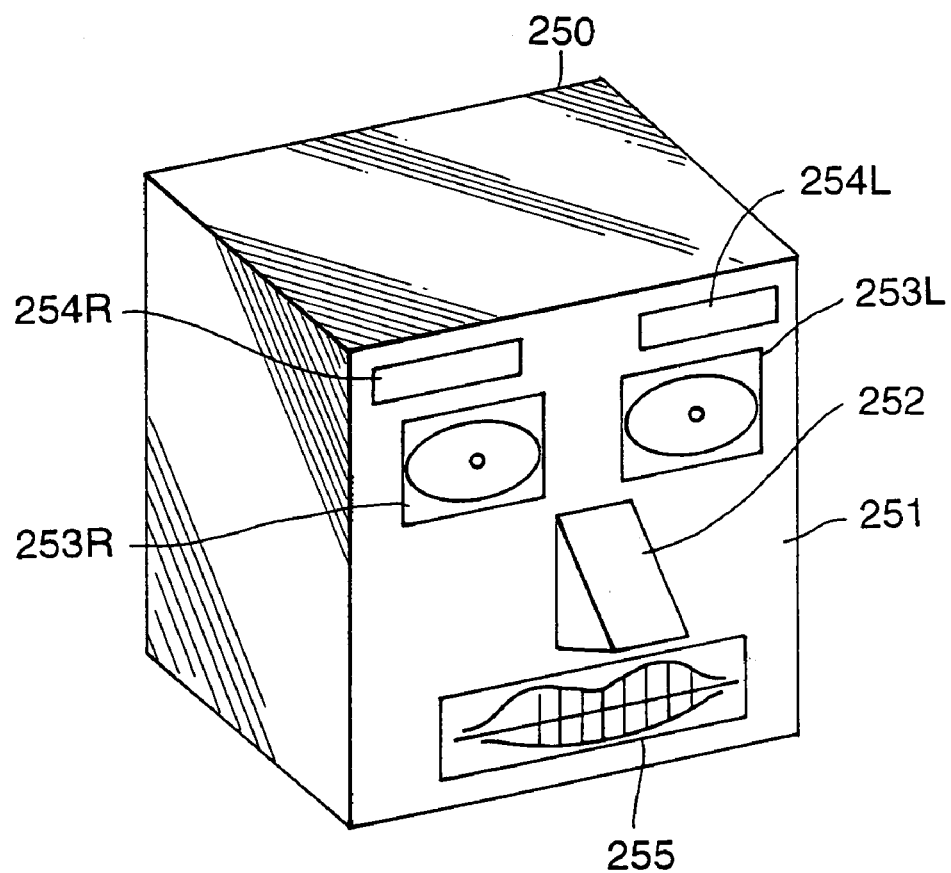
FIG. 9 is an explanatory diagram for describing the processing for producing facial expressions in game characters in a second embodiment of the present invention.
Figure 10:
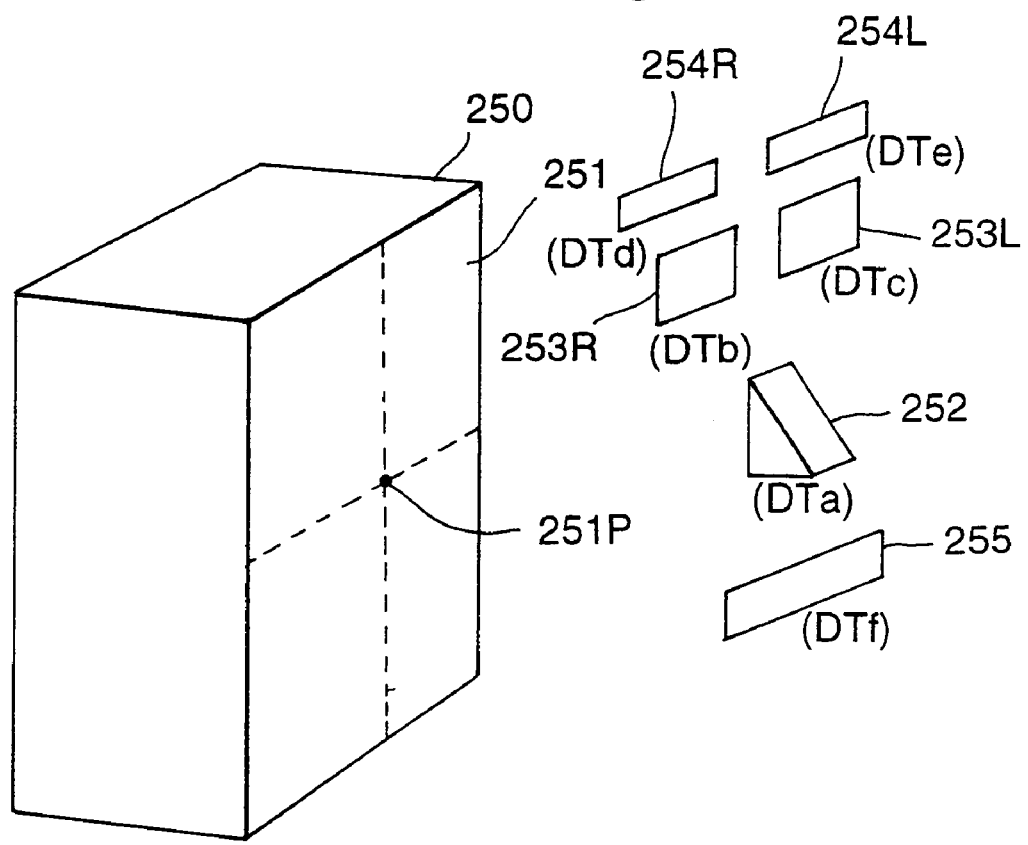
FIG. 10 is an explanatory diagram concerning polygons in the second embodiment of the present invention.
Figure 11:
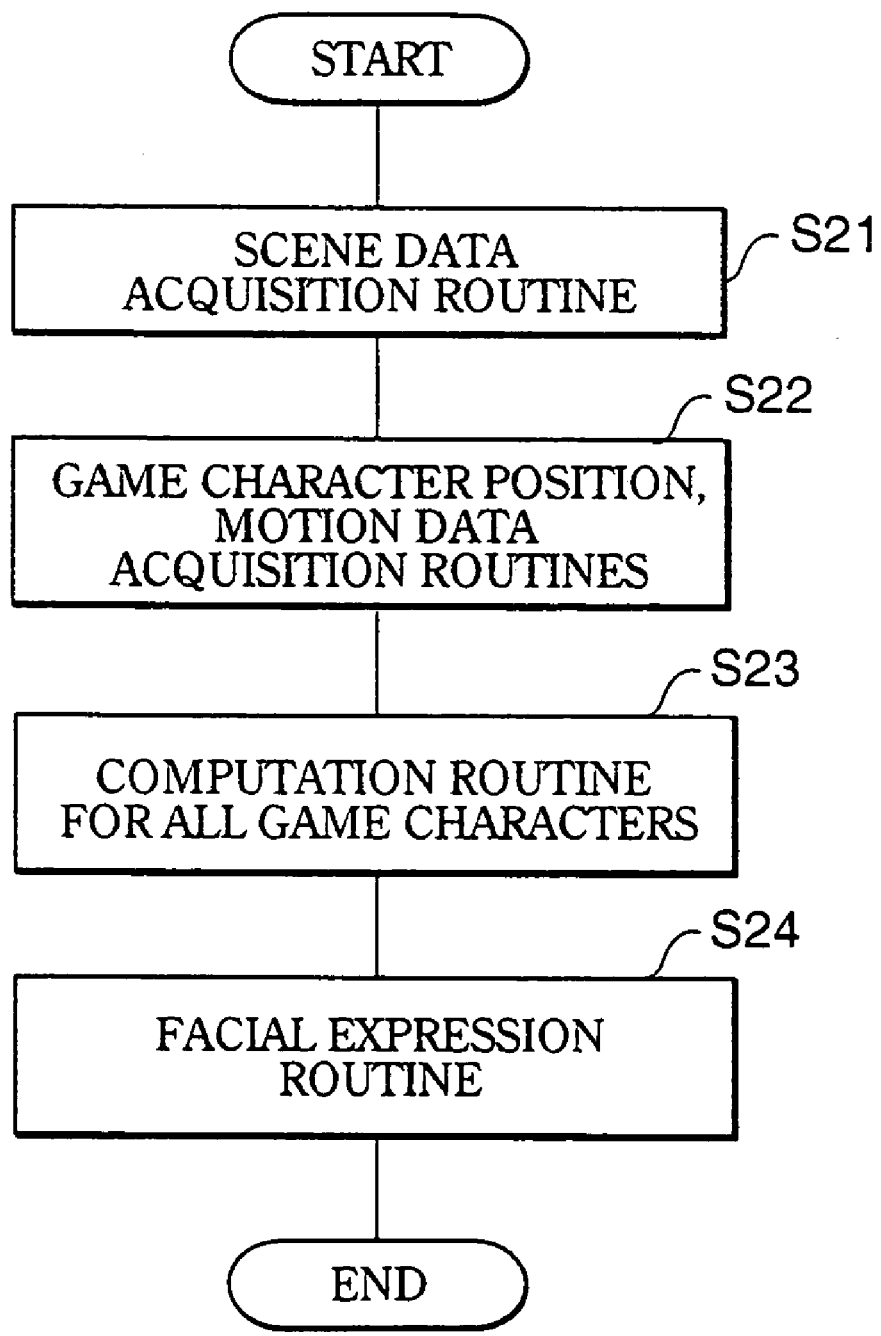
FIG. 11 is a flowchart for describing movement in the second embodiment of the present invention.

A second embodiment of the present invention is now described, making reference to FIGS. 9 through 11 concerning the process of producing facial expressions in game characters constituting image data.

The configuration of the apparatus will be described first. The video game machine used in the first embodiment, diagrammed in FIGS. 1 and 2, is used as the apparatus in this second embodiment.

The process for producing facial expressions in game characters is described next.

FIG. 9 is an explanatory diagram for describing the facial expression production process for game characters in the second embodiment of the present invention. In this figure, a head polygon 250 configuring the head in game character data 200 comprises, for example, a hexahedron. Within the outline of one face 251 of this head polygon 250, in the center of that face 251, a polygon 252 that forms the nose is provided. Also, polygons 253R and 253L that form the eyes are provided, above and to the left and right of the nose polygon 252, in the face 251, within the outline thereof, in the head polygon 250. Polygons 254R and 254L forming eyebrows are also positioned, respectively, above the eye polygons 253R and 253L, in the face 251. Below the nose polygon 252, in the face 251, within the outline thereof, in the head polygon 250, is positioned a polygon 255 that forms the mouth. A nose texture pattern is applied beforehand to the nose polygon 252 in the game character data 200, while, in like manner, an eye texture pattern is applied to the eye polygons 253R and 253L, an eyebrow texture pattern is applied to the eyebrow polygons 254R and 254L, and a mouth texture pattern is applied to the mouth polygon 255.

By these means, facial expressions are represented in the face 251 of the head polygon 250 in the game character data 200.

In the second embodiment, as described in the foregoing, in addition to having the nose, eye, eyebrow, and mouth polygons 252 through 255 prepared, a plurality of texture patterns are also prepared for the nose, eyes, eyebrows, and mouth, so that, in response to facial expression instruction data, appropriate patterns are selected from the plurality of texture patterns and applied, respectively, to the polygons 252 through 255.

FIG. 10 is an explanatory diagram for the polygons in the second embodiment in the present invention. In this figure, a reference point 251P is provided within the outline of the face 251 in the head polygon 250. The nose polygon 252 has position data DTa for positioning away from the reference point 251P. The eye polygons 253R and 253L have position data DTb and DTc for positioning away from the reference point 251P. Similarly, the eyebrow polygons 254R and 254L have position data DTd and DTe, and the mouth polygon 255 has position data DTf, for positioning, respectively, away from the reference point 251P. In this embodiment, each of the polygons 253R, 253L, 254R, 254L, and 255 comprise a single polygon, and the eyes, eyebrows, and mouth are represented by applying appropriate texture patterns to these polygons 252, 253R, 253L, 254R, 254L, and 255, respectively. These polygons 252, 253R, 253L, 254R, 254L, and 255, with facial texture patterns applied, are stored, for example, in the VRAM 121.

In this second embodiment, moreover, each of these polygons 252, 253R, 253L, 254R, 254L, and 255 is independent, so that it is possible to rotate, enlarge, reduce, or move each of these polygons 252, 253R, 253L, 254R, 254L, and 255 by itself. In this embodiment, furthermore, as concerning the texture patterns also, each of the polygons can be rotated, enlarged, reduced, or moved with the texture applied. In addition, the texture patterns themselves can each be rotated, enlarged, reduced, or moved.

Figure 12:
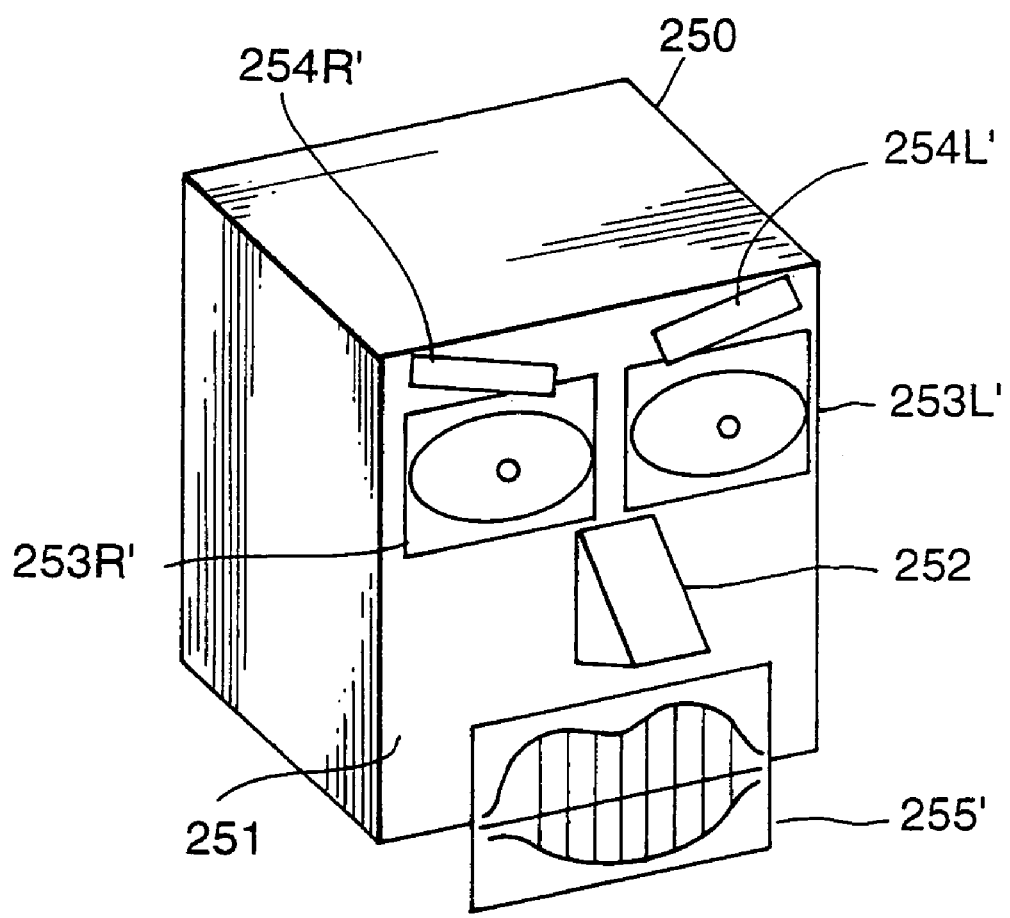
FIG. 12 is a diagram representing movement-induced changes in the facial expression of a game character in the second embodiment of the present invention.
Figure 13:
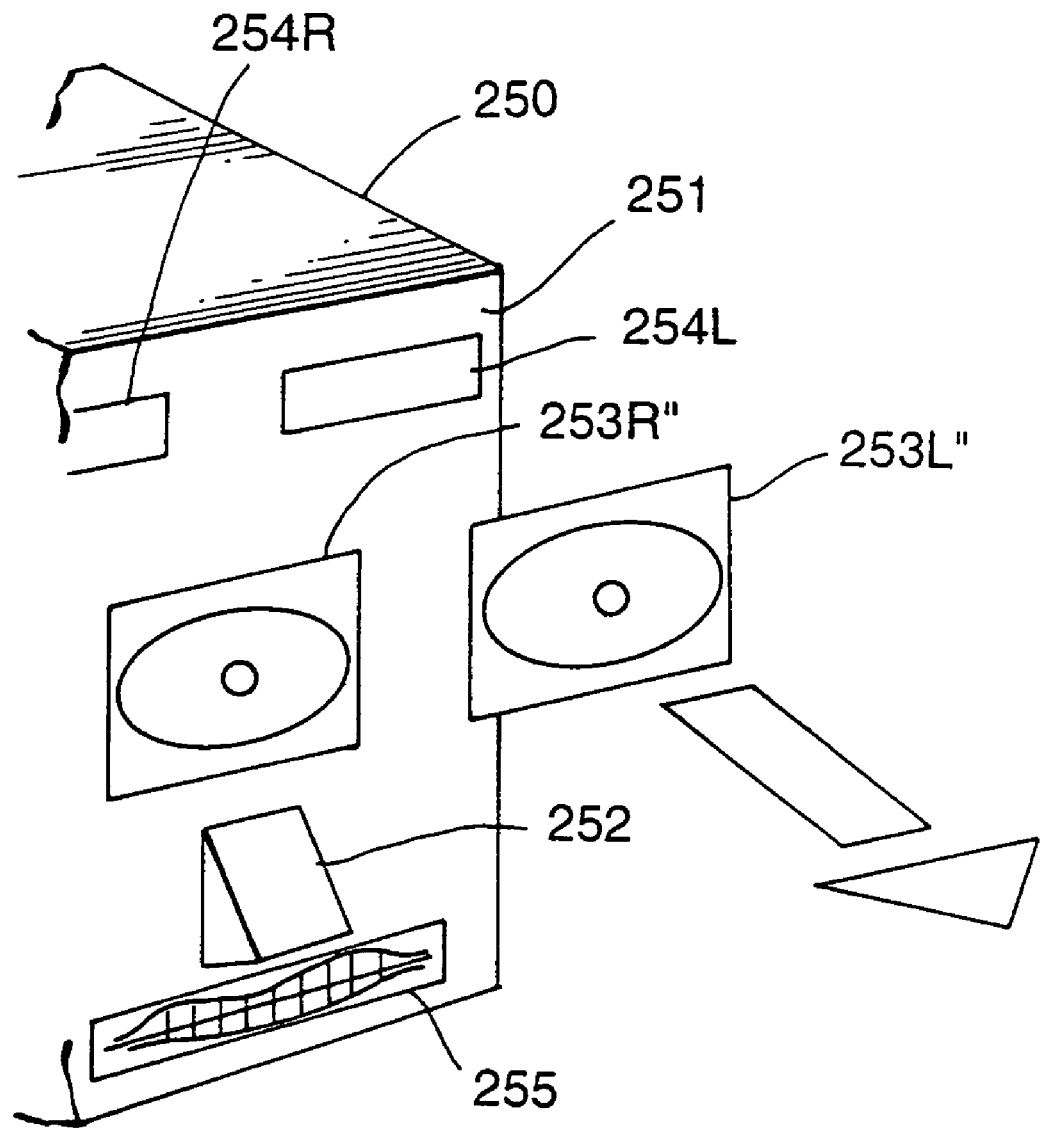
FIG. 13 is a diagram representing movement-induced changes in the facial expression of a game character in the second embodiment of the present invention.

FIG. 11 is a flowchart for describing the action in the second embodiment of the present invention. FIGS. 12 and 13 are diagrams showing how the game character facial expressions are changed by this action.

Looking at FIG. 11, let it be assumed that the game has been started, some time has passed, and some scene has been reached. Let it be further assumed that some command input has been made to the sub-CPU 104 from a pad 2b. Thereupon, the main CPU 101, in conjunction with the progress of the game, accesses the n'th scene data from the subsystem 13, etc. (step S21 in FIG. 11).

Based on the command from the pad 2b and the current scene data, the main CPU 101 sends position data for positioning the game character data 200 on the screen, together with motion data and other data necessary for facial expressions, via the VDP 120 to the VRAM 121 for storage (step S22 in FIG. 11).

The VDP 120 determines the position of the center of the torso polygon based on screen position data P1 for the game character data 200 stored in the VRAM 121. Then, based on the motion data, the VDP 120 computes the torso polygon from the center position for the torso polygon, computes the head polygon, wrist polygons, and ankle polygons, and stores these alternately in the frame buffers 122 and 123 (step S23 in FIG. 11).

At this time, the VDP 120, based on the data pertaining to and necessary for facial expressions, processes the polygon 252 to which a nose texture pattern has been applied, positioned in the face 251 in the head polygon 250, the polygons 253R and 253L to which eye texture has been applied, positioned accordingly, the polygons 254R and 254L to which eyebrow texture has been applied, positioned accordingly, and the polygon 255 to which mouth texture has been applied, positioned accordingly. Then the VDP 120 takes those processing results and stores them alternately in the frame buffers 122 and 123 (step S24 in FIG. 11). In this routine in step 24, in a case, for example, where the facial expression data are as follows, the VDP 120 executes the image processing now described. That is, when the facial expression data are the commands "rotate the eyebrows in the face through a predetermined angle," "enlarge the eyes by a predetermined magnification factor," and "make the mouth move forward while enlarging it," the VDP 120, as depicted in FIG. 12, performs processing such that the eyebrow polygons 254R and 254L, with appropriate texture patterns applied, are rotated in their current positions so that the two eyebrows 254R' and 254L' are displayed knitted together in a V shape; performs processing such that the eye polygons 253R and 253L, with appropriate texture patterns applied, are enlarged in their current positions so that two eyes 253R' and 253L' are displayed larger; and performs processing such that the mouth polygon 255, with appropriate texture pattern applied, is moved forward from its original position and simultaneously enlarged so that the large mouth 255' is displayed as jumping out toward the front. If, on the other hand, in the routine in step 24, the data pertaining to facial expression are as follows, the VDP 120 will perform the image processing noted below. That is, when the facial expression data are the command "make the eyes jump out from the face," the VDP 120 moves the eye polygons 253R and 253L, with appropriate texture patterns applied, forward from their current positions, so that the eyes 253R" and 253L" are displayed jumping out from the head.

In this second embodiment, the nose polygon 252, eye polygons 253R and 253L, eyebrow polygons 254R and 254L, and mouth polygon 255 in the face 251 in the head polygon 250 can each be independently enlarged, reduced, rotated, and moved, while the face 251 in the head polygon 250 is not itself affected by these changes in the polygons 252 through 255. Therefore the outline of the current face 251 does not break down even when extreme facial expressions are rendered. In this second embodiment, moreover, even a single texture pattern can be rotated, enlarged, reduced, or moved, making it possible to produce very colorful expressions. By increasing the number of texture patterns, furthermore, facial expressions can be rendered which have far more variation than with conventional texture pattern changes and model changes. In this second embodiment, also, comic expressions can be rendered by, for example, making the eyes jump out or drop.

Furthermore, with the second embodiment described in the foregoing, each of the polygons in the face, that is, the eye polygons 253R and 253L, the eyebrow polygons 254R and 254L, and the mouth polygon 255, respectively, is a single polygon. However, depending on how the conditions change, two or more polygons may be used in producing eye, eyebrow, or mouth expressions. Alternatively, the expressions made by the eyes, eyebrows, and mouth may be changed by altering the apex of each single polygon, so as to change the shape of that polygon.

Figure 14A:
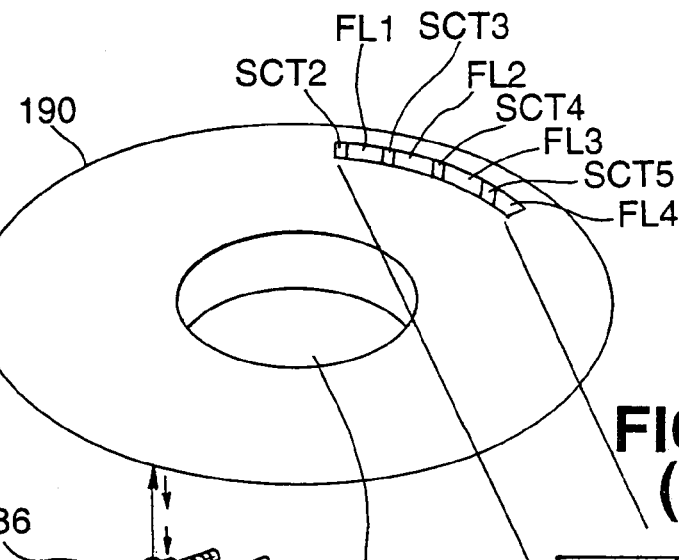
FIG. 14 is a simplified configurational diagram of a third embodiment of the present invention.
Figure 14B:
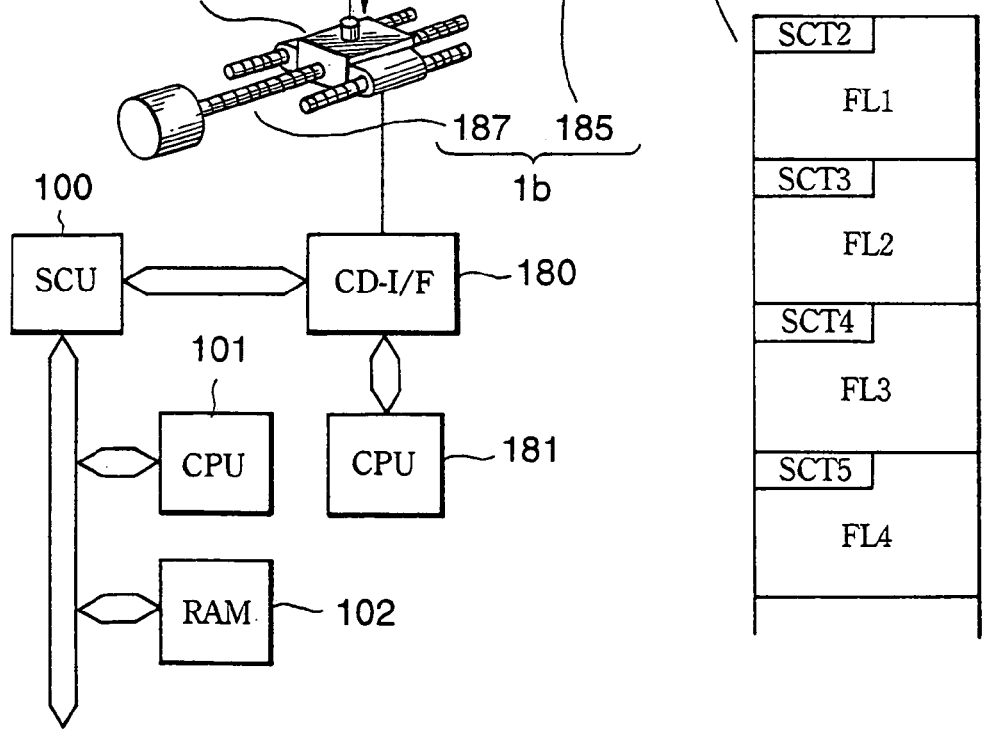

A third embodiment of the present invention is now described. FIG. 14 is a simplified configurational diagram of the third embodiment. FIG. 14(a) depicts a portion of the hardware diagrammed in FIG. 2 for playing back sound data recorded on a CD-ROM, together with a CD-ROM loaded in a CD-ROM drive. FIG. 14(b) is a block diagram representing an example configuration of the data recorded on the CD-ROM. A plurality of files, FL1, FL2, FL3, FL4, . . . , are recorded on the CD-ROM 190, as shown in FIGS. 14(a) and 14(b). In each of these files FL1, FL2, FL3, FL4, . . . , respectively, as diagrammed in FIGS. 14(a) and 14(b), lead sector information for the next file is recorded in the lead portion of the current file, that is, lead sector information SCT2 for the next file FL2 is recorded in the lead segment for the file FL1, lead sector information SCT3 for the next file FL3 is recorded in the lead segment for the file FL2, lead sector information SCT4 for the next file FL4 is recorded in the lead segment for the file FL3, and lead sector information SCT5 for the next file FL5 is recorded in the lead segment for the file FL4, etc. In each case, this lead sector information SCTn (n=1, 2, 3, . . .) is configured in 4 bytes, for example.

The CD-ROM drive 1b in the subsystem 13 comprises a turning mechanism 185 that includes a motor for turning the CD-ROM 190, and a movement mechanism 187 that includes a motor for moving the reading head 186. The turning mechanism 185 and moving mechanism 187, while not shown in the drawing, are subjected to turning drive control based on data read by the reading head 186 from the CPU 181. The reading head 186 of the CD-ROM drive 1b is connected to the CD interface 130 and CPU 181, etc. The reading head 186 is also connected via the CD interface 180 to the SCU 100. In the SCU 100, the main CPU 101 and RAM 102, etc., are connected via the CPU bus 105.

The processing for playing back the data recorded in the CD-ROM is now described.

Figure 15:
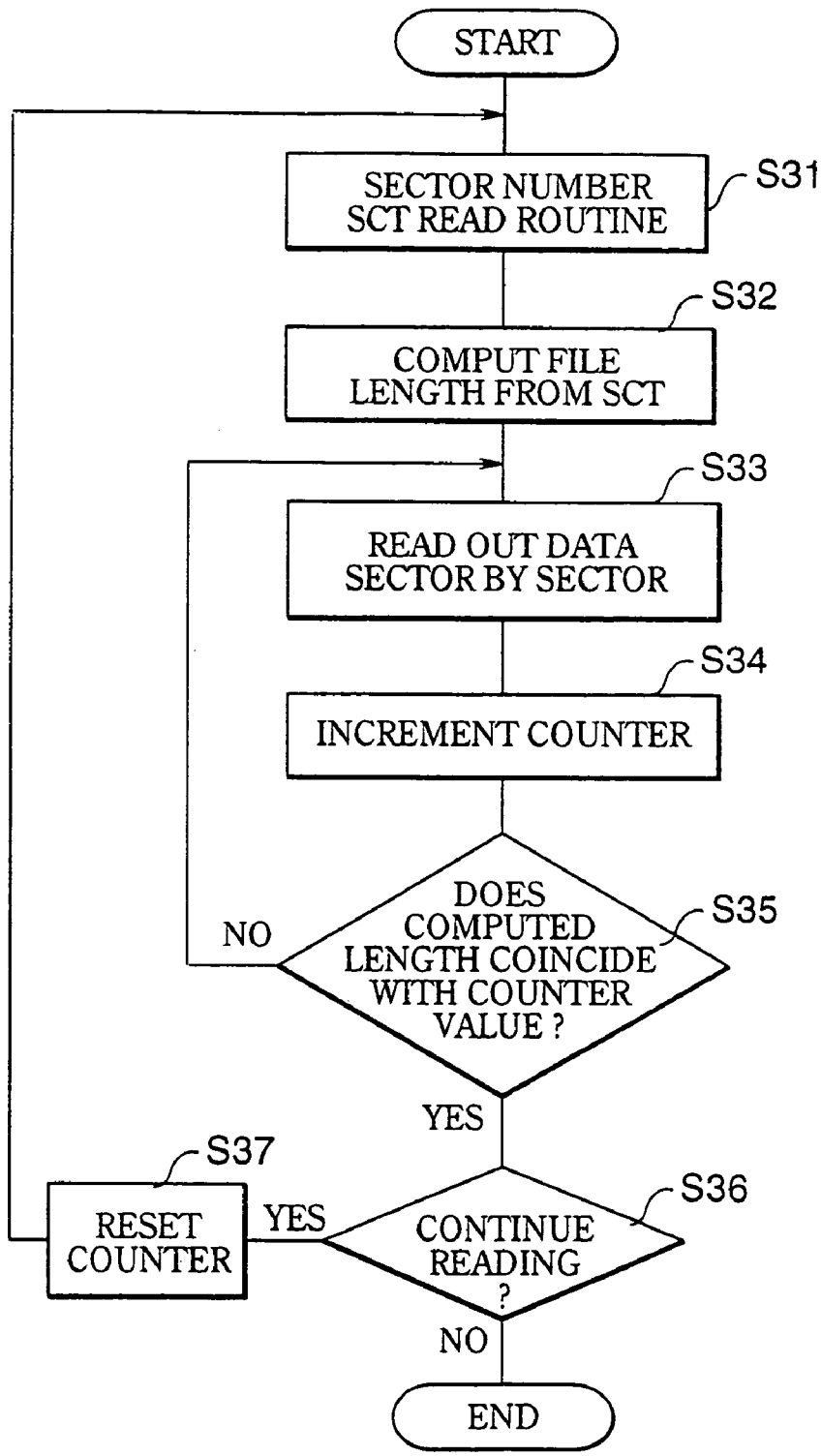
FIG. 15 is a flowchart for describing movement in the third embodiment of the present invention.

FIG. 15 is a flowchart for describing the action of the third embodiment in the present invention. The main CPU 101, according to the development of the game, executes routines for reading files FL, FL2, etc., for video or audio data, for example, from the CD-ROM 190, via the CD interface 180 in the subsystem 13.

When these routines are entered, the flowchart given in FIG. 15 is entered, whereupon the main CPU 101 first reads out the sector information SCT2 that is the readout information at the beginning of the file FL1, by means of the reading head 186, via the CD interface 180 and the SCU 100 (step S31). Next, the main CPU 101 computes the length of the file FL1 based on the sector information SCT2 (step S32).

The main CPU 101 reads out data sector by sector from the CD-ROM 190 that is loaded in the CD-ROM drive 1b, via the SCU 100 and CD interface 180 (step S33), and increments an internal counter in the main CPU 101 (step S34).

Figure 16A:
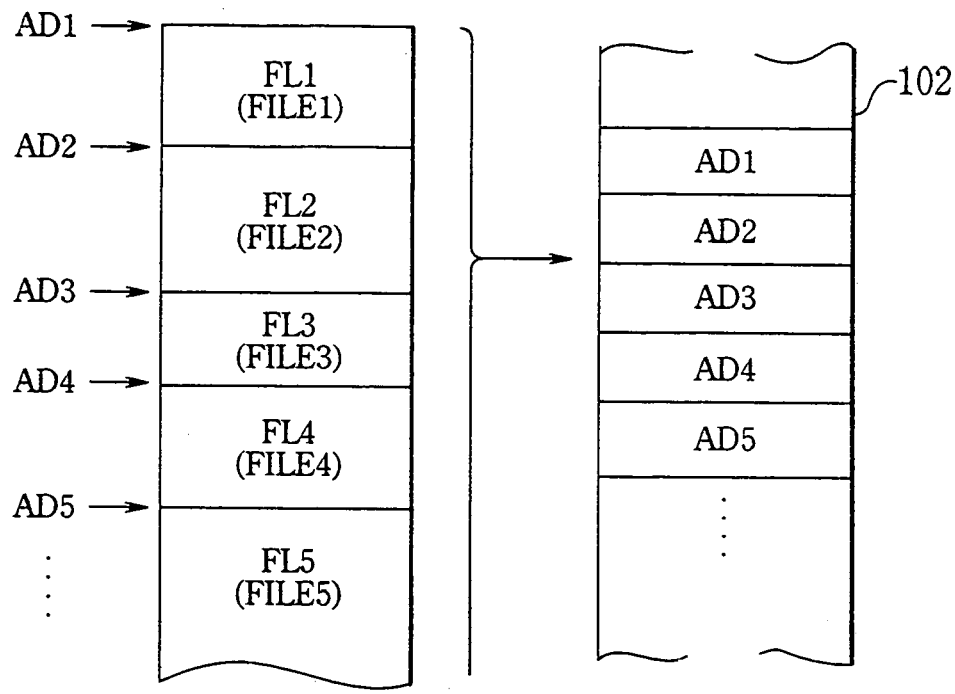
FIG. 16 is a diagram for describing a comparison between the third embodiment of the present invention and an example wherein the third embodiment is not applied.
Figure 16B:
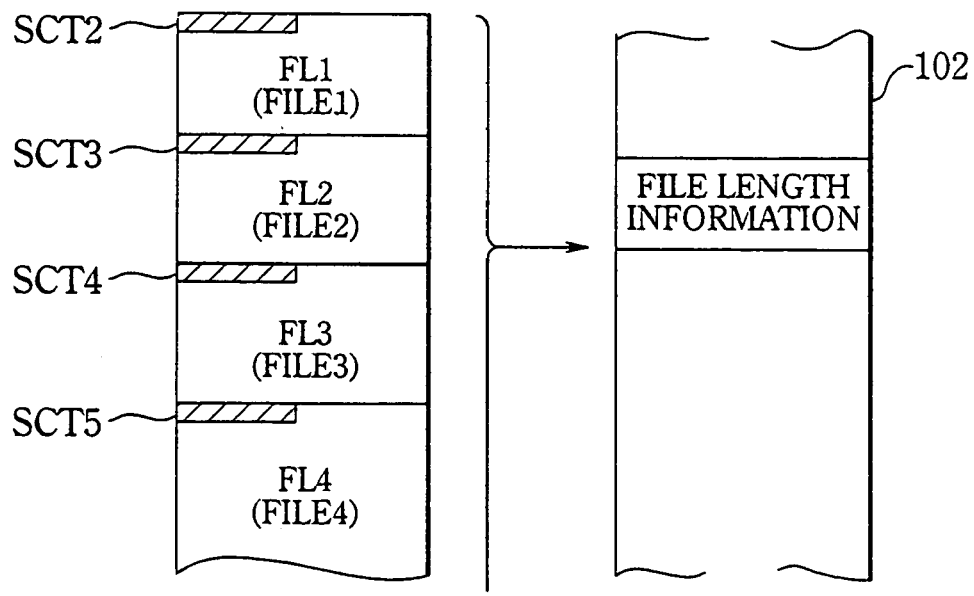

The main CPU 101 then compares the computed sector length against the value in the counter (step S35). If it determines that those two values do not coincide (step S35: No), the main CPU 101 again performs the subroutines from step 33. Once it determines that the two values do coincide, however, it then determines whether or not it is necessary to read more of the file FL (step S36). If it determines here that it is necessary to read the file FL further (step S36: Yes), the main CPU 101 first resets the counter (step S37), and again executes the subroutines from step 31, but if that is not necessary (step S36: No), then this routine is ended. FIG. 16 is a diagram for describing a comparison between the third embodiment of the present invention with a case (i.e. the prior art) wherein this third embodiment is not applied. FIG. 16(a) is an explanatory diagram for the prior art, while FIG. 16(b) is an explanatory diagram for the third embodiment of the present invention.

In the technology wherein the third embodiment is not applied, as diagrammed in FIG. 16(a), the data AD1, AD2, and AD3, etc., indicated by the arrows in the files FL1, FL2, and FL3, etc., in the CD-ROM 190, are stored in designated areas in the RAM 102, and file data have to be read out from the CD-ROM drive 1b based on these data in the designated areas in the RAM 102. In contrast thereto, when the third embodiment of the present invention is implemented, as diagrammed in FIG. 16(b), for example, the length of the file FL1 is computed from the leading sector information SCT2 for the next file FL2 that is at the beginning of the file FL1, this computation result is held in a designated area in the RAM 102, and the file FL1 can be read from the CD-ROM 190 according to whether the number of sectors read out coincides with that computation result. In like manner, the length of any other current file FLn-1 is computed from the leading sector information SCTn for the next file FLn that is at the beginning of the file FLn-1, this computation result is held in a designated area in the RAM 102, and the file FLn-1 can be read from the CD-ROM 190 according to whether the number of sectors read out coincides with that computation result.

Accordingly, by means of the third embodiment in the present invention, all that need be stored in the RAM 102 is the length information for a single file FLn-1 that is computed from the leading sector information SCTn, thus making it possible to reduce the volume of data continually resident in the RAM 102 to almost zero.

A fourth embodiment of the present invention is now described. Making reference to FIGS. 17 through 22, processing for broadcasting the play-by-play in each scene as a game develops is described as pertaining to the fourth embodiment.

The configuration of the apparatus is first described.

The video game machine main unit 1 used in conjunction with the first embodiment depicted in FIGS. 1 and 2 herein is used as the apparatus in this fourth embodiment.

The play-by-play broadcasting processing for each scene as the game progresses is now described. In the interest of simplifying the description, the presupposed play-by-play processing is first described.

Figures 17, 18:
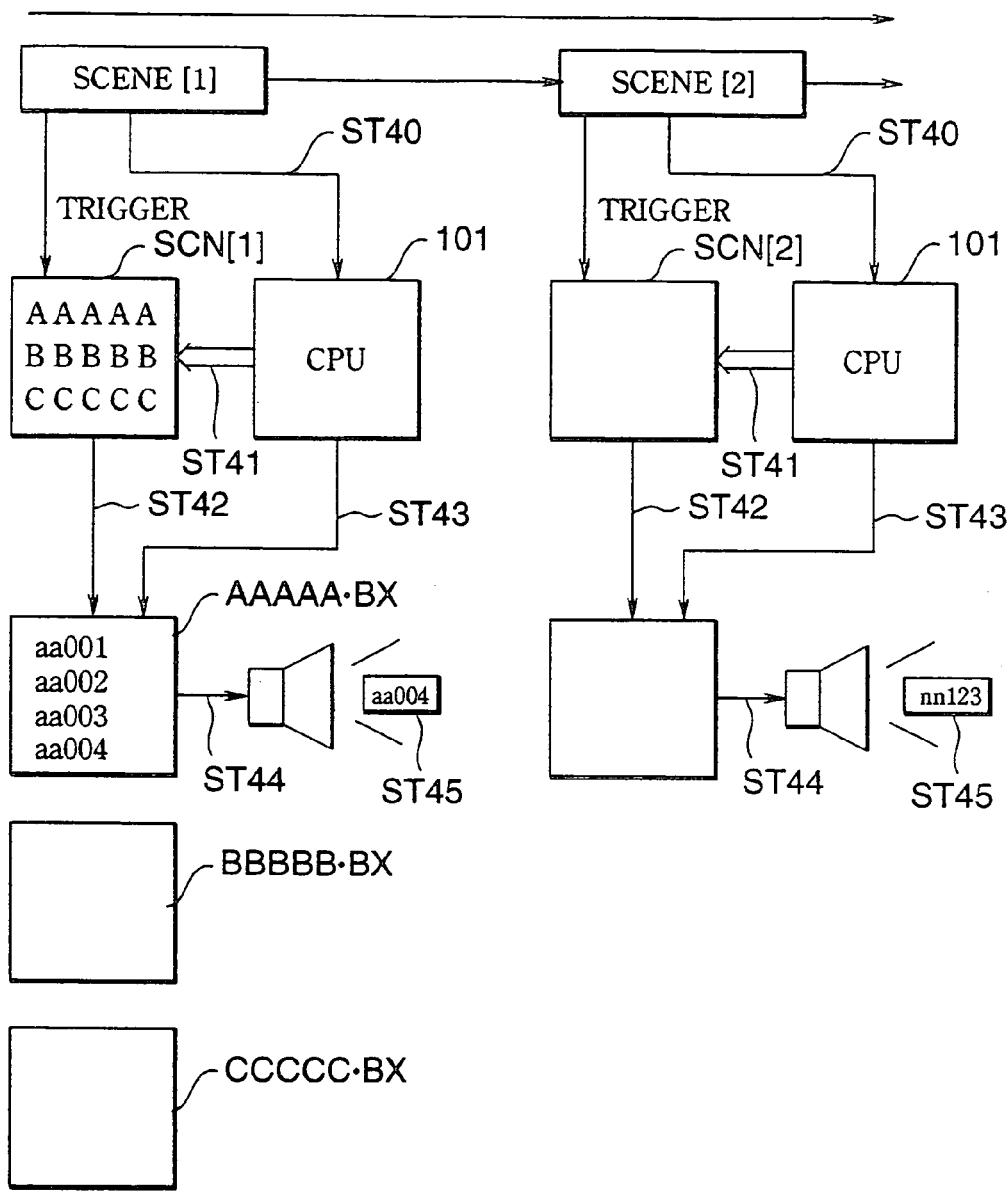
FIG. 17 is a conceptual diagram representing the basic procedures for outputting play-by-play in a fourth embodiment of the present invention.
FIG. 18 is a diagram representing a general example of a text box in the fourth embodiment of the present invention.

FIG. 17 is a conceptual diagram representing the basic procedures for outputting the play-by-play in the fourth embodiment of the present invention. In this diagram, in this fourth embodiment, the main CPU 101 reads out application software, either from the CD-ROM 190 or from a ROM cartridge loaded in the cartridge interface 1a, and develops the game according to the elapsed time t. That is, the main CPU 101 executes the application software and sequentially selects and outputs game scenes according to the commands from the pads 2b and the way the game develops. Let it be assumed, hypothetically, that the main CPU 101 is executing scene 1 in conjunction with the development of the game. Thereupon, when the main CPU 101 is executing the scene 1, the scene box SCN 1 is compelled by a trigger. This scene box is a box containing a plurality of conditions that would probably be used for the scene, and is provided by the game software for each scene in the game.

Now, at this time, when it is processing the content of the scene 1, the main CPU 101 acquires conditions according to the content of the scene 1 (where, if the scene is one wherein a pitcher makes a pitch, for example, condition "AAAAA" might be that "the pitch be made when the pitcher's form is poor," condition "BBBBB" might be that "the opponent team is winning," and condition "CCCCC" might be that "the pitcher has thrown") (step ST40). The main CPU 101, based on the conditions acquired, makes decisions on the conditions "AAAAA," "BBBBB," and "CCCCC" written internally in the scene box SCN 1 (step S41). Corresponding to each of the conditions "AAAAA" "BBBBB," and "CCCCC," moreover, there are text boxes, namely AAAAA-BX, BBBBB-BX, and CCCCC-BX. What is meant here by a text box is a box to which is written an audio file name, so that the audio file name becomes the name of the text box. The text box diagrammed in FIG. 18 is designated "NNNNN-BX," meaning that it may be any text box. A dialog number "nn123" is also written in the text box NNNNN-BX. This dialog number may be configured with an identifier code consisting of two alphabetic characters "nn" and a three-digit number "123," thus comprising five characters.

Next, in the case of this scene 1, the main CPU 101, since the only condition acquired is "AAAAA," selects the condition "AAAAA" from among the conditions "AAAAA," "BBBBB," and "CCCCC" in the scene box SCN 1. By so doing, the main CPU 101 jumps to the text box AAAAA-BX (step S42). In this embodiment, the text box AAAAA-BX contains the dialog numbers "aa001," "aa002," "aa003," and "aa004," together with dialogs corresponding to these dialog numbers.

Now, when the main CPU 101 sends a random selection command to this text box AAAAA-BX (step S43), the dialog number "aa004" will be selected (step S44). Based on this dialog number "aa004," the dialog corresponding to the number "aa004" is selected from the dialogs contained in the box and sent to the sound block 12. Thus the sound of the dialog corresponding to the number "aa004" will be produced from the speaker 5b (step S45). When the game develops further by advancing to scene 2, and the scene box SCN 2 is initiated by the trigger, the subsequent processing routines will be the same as those described above.

Specific processing routines are now described.

Taking the example of a baseball game, a detailed description is here given in conjunction with specific examples.

FIGS. 19 and 20 are explanatory diagrams representing some dialog numbers and dialog content in text boxes. As to the relationship between the dialog numbers and the dialogs, in the example of a draft session represented in FIG. 19, categorizations are made, as in "1. Session opening comments," and "2. Drawing related." The categorized dialogs are considered as one text box, the category constituting the name of the text box, and dialog numbers and dialog written therein. Dialogs are associated with dialog numbers, respectively, as, in the case of "1. Session opening comments," the dialog number "PD001" is associated with the dialog "We will now begin the draft session to select new players for this year," while the dialog number "PD002" is associated with the dialog "We will now begin the draft session to select new players for the current year," and other dialog numbers are associated with other matching dialogs, respectively.

In the category "2. Drawing related," the dialog number "PD005" is associated with the dialog "The name has been selected more than once, so we will now conduct a drawing," while the dialog number "PD006" is associated with the dialog "The player has been selected by more than one team, so we will now conduct a drawing," and other dialog numbers are associated with other matching dialogs, respectively.

Similarly, in terms of the relationship between the dialog numbers and the dialogs, as set forth in FIG. 20, for example, we have the divisions "69. Asking for a comment concerning a certain player when the team has a good scoring opportunity," and "70. Asking for a comment on the situation when the team is in trouble." These dialog categories are each considered text boxes, and these categories become the names of the text boxes.

In the case of "69. Asking for a comment concerning a certain player when the team has a great scoring opportunity," the dialog number "NF542" is associated with the dialog "This opportunity is met by a roar from the crowd in the stands," while the dialog number "NF543" is associated with the dialog "This player is now at bat with a runner in scoring position," and other dialog numbers are associated with other matching dialogs, respectively.

Figure 21:
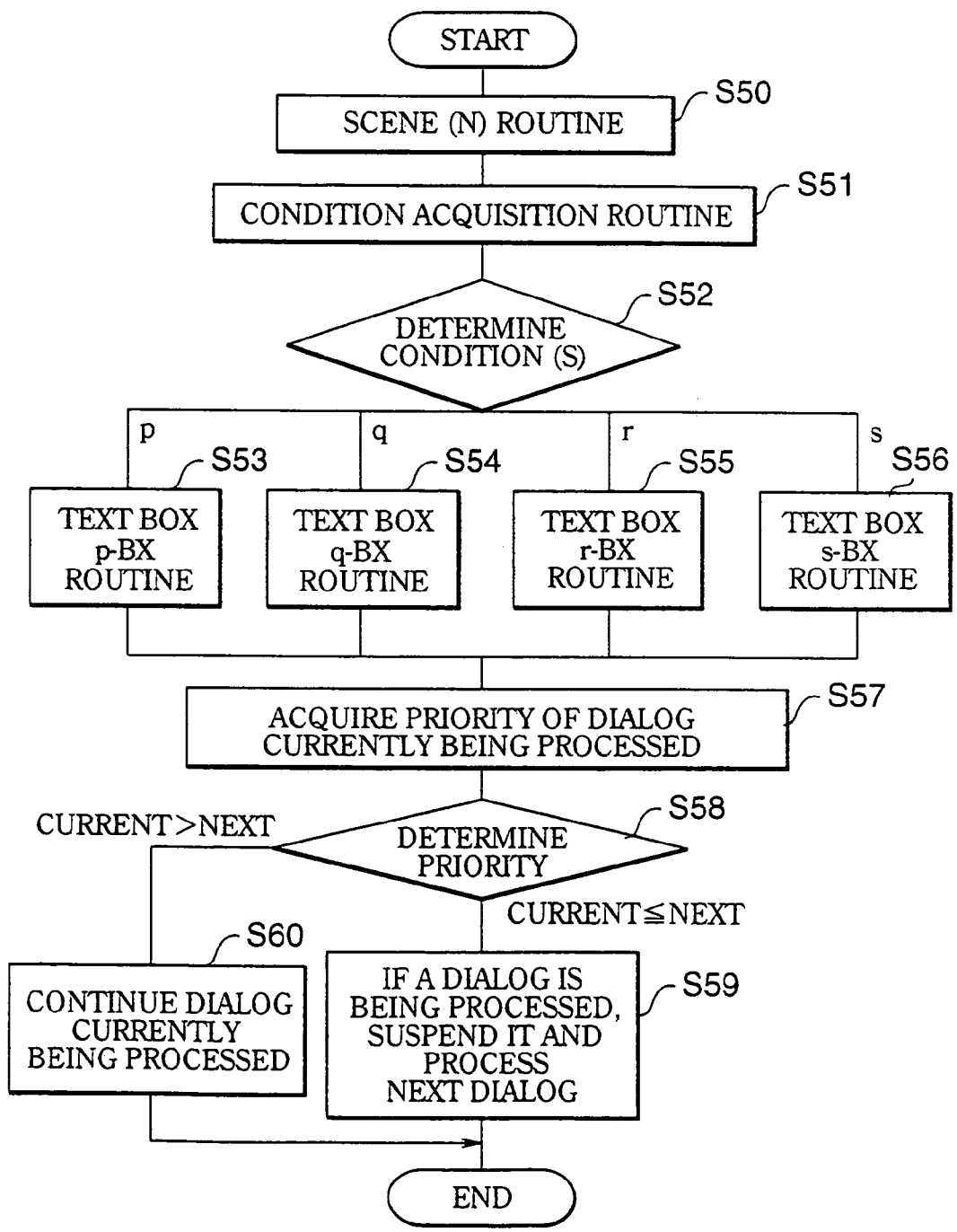
FIG. 21 is a flowchart for describing movement in the fourth embodiment of the present invention.

In the case of "70. Asking for a comment on the situation when the team is in trouble," the dialog number "NF545" is associated with the dialog "We can't relax even with this large lead," while the dialog number "NF546" is associated with the dialog "We can't let this pitcher get into a rhythm," and other dialog numbers are associated with other matching dialogs, respectively. FIG. 21 is a flowchart for describing the action in the fourth embodiment of the present invention. In FIG. 21, when a discretionary scene N (where N=1, 2, 3, etc.) is being processed, there are discretionary conditions (p, q, r, s) in a scene box SCN N in that discretionary scene N, and, in addition, there are discretionary text boxes p-BX, q-BX, r-BX, and s-BX corresponding to those conditions. The processing of play-by-play broadcasting under these conditions is described.

Figure 22:
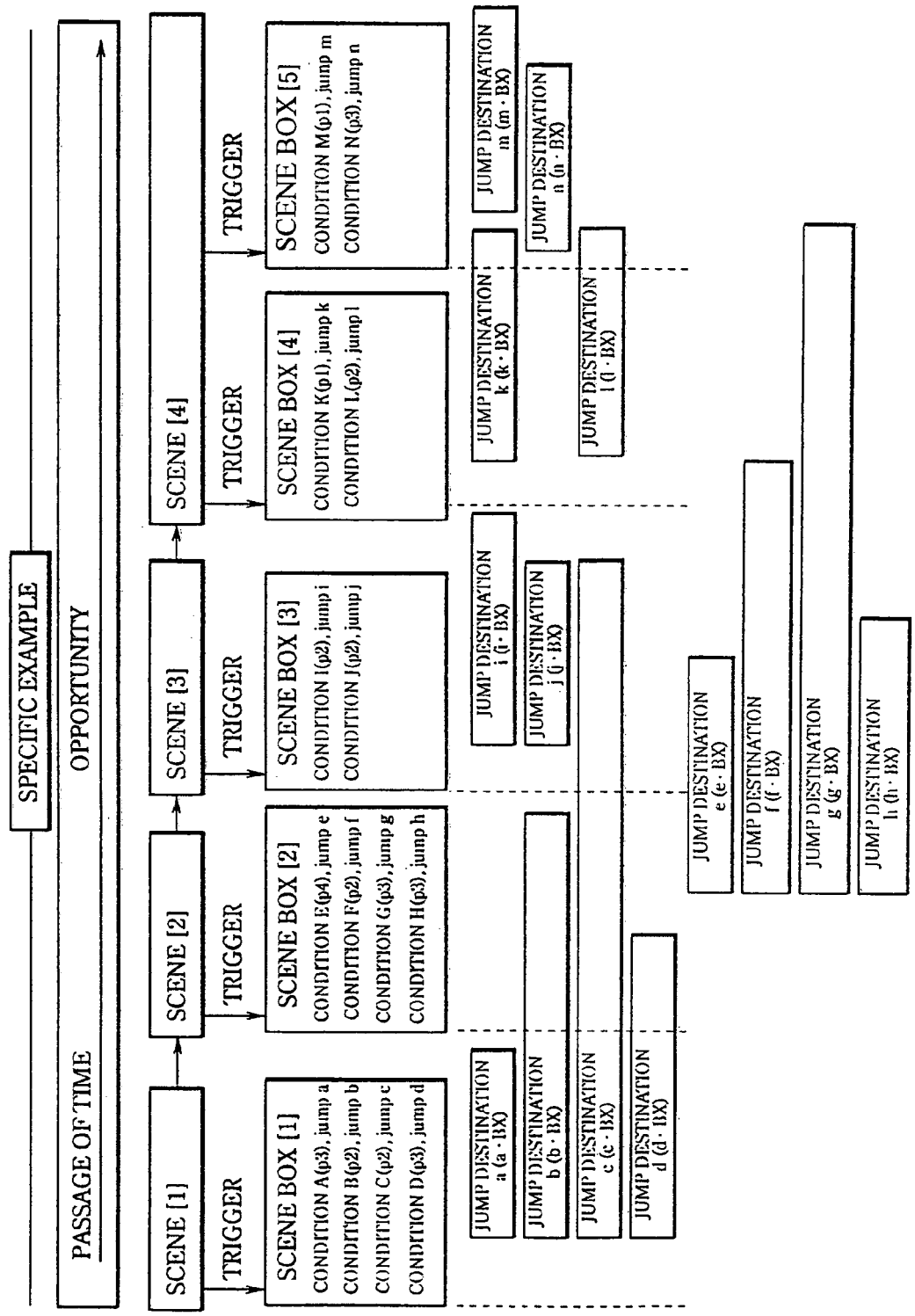
FIG. 22 is a timing chart for describing movement in the fourth embodiment of the present invention.

FIG. 22 is a flowchart for describing the action in this fourth embodiment, wherein the passage of time is plotted on the horizontal axis. On the vertical axis are positioned game scenes, namely scene 1, scene 2, scene 3, etc., scene boxes SCN 1, SCN 2, SCN 3, etc., and text boxes a-BX, b-BX, c-BX, . . . m-BX, n-BX, etc., that may be jumped to when determining the conditions for the scene boxes SCN 1, SCN 2, and SCN 3, etc. Let it be assumed that the game is underway and that processing is being executed for scene 1 with N=1 (step S50). Thereupon, as may be seen in FIG. 21, in scene 1, a trigger is tripped resulting in scene box SCN 1 being accessed. Written to this scene box 1, in this embodiment, are condition A (p3), jump a, condition B (p2), jump b, condition C (p2), jump c, condition D (p3), and jump d.

(Scene Box SCN 1 Processing Routine)

In conjunction with the processing routine for scene 1, the main CPU 101 acquires conditions (if it is a "scene wherein a pitcher is making a pitch," the condition might be that "the pitch be made when the pitcher's form is poor," or "the opponent team is winning," or "the pitcher made the throw," etc.) (step S51).

The main CPU 101 then compares these acquired conditions against the conditions A, B, C, and D in the scene box SCN 1 (step S52). In this case, we have A=p, B=q, C=r, and D ==. As a result of determining the conditions, the main CPU 101 jumps to the text box a-BX when condition A is selected (step 53), jumps to the text box b-BX when condition B is selected (step 54), jumps to the text box c-BX when condition C is selected (step S55), and jumps to the text box d-BX when condition D is selected (step S56).

As indicated in FIG. 22, processing routines are executed by the main CPU 101 for the text boxes (a-BX, b-BX, c-BX, and d-BX) selected according to the condition. As seen in FIG. 22, for example, the processing routine for text box a-BX terminates before the beginning of scene 2, the routine for text box b-BX terminates at the end of scene 2, the routine for text box c-BX terminates at the end of scene 3, and the routine for the text box d-BX terminates in the middle of scene 2. It is assumed here that condition A, for example, has been selected. Thereupon, the main CPU 101 detects whether or not a dialog is currently being processed, and acquires the priority of that dialog (step S57).

The main CPU 101 then determines the priority (step S58). When the priority of the next dialog is higher or the same as the priority of the dialog currently being executed, the main CPU 101 interrupts the dialog currently being processed and plays the dialog in the next text box (step S59). If the priority of the dialog currently being processed is higher than the priority of the next dialog, the dialog currently being processed is continued (step S60).

In this case, wherein condition A is selected, there is no previous priority, so the next priority (p3) is deemed to be higher, and the next dialog is started.

The routine for scene box SCN 2 is described next.

Here, the game has progressed, and the processing for scene 2 with N=2 is performed. (step S50). Thereupon, in scene 2 as indicated in FIG. 22, a trigger is tripped and the scene box SCN 2 is accessed. In this scene box SCN 2, in this embodiment, are written condition E (p4), jump e, condition F (p2), jump f, condition G (p3), jump g, condition H (p3), and jump h.

The main CPU 101 acquires conditions in conjunction with the processing of this scene 2 (step S51). Next the main CPU 101 compares the acquired conditions against the conditions E, F, G, and H in the scene box SCN 2 (step S52). In this case we have E=p, F=q, G=r, and H=s. Based on the conditions determined, the main CPU 101 jumps to the text box e-BX when condition E is selected (step S53), jumps to the text box f-BX when condition F is selected (step S54), jumps to the text box g-BX when condition G is selected (step S55), and jumps to text box h-BX when condition H is selected (step S56). As indicated in FIG. 22, processing routines are executed by the main CPU 101 for the text boxes e-BX, f-BX, g-BX, and h-BX selected according to the condition. As indicated in FIG. 22, for example, the processing routine for the text box e-BX terminates in the middle of scene 3, the routine for the text box f-BX terminates at the beginning of scene 4, the routine for the text box g-BX terminates at the end of scene 4, and the routine for the text box h-BX ends in the middle of scene 3.

It is assumed now that condition F, for example, is selected. Thereupon, the main CPU 101 detects whether a dialog is currently being processed. When a dialog is currently being processed, the main CPU 101 acquires the priority of that dialog (step S57). Here no dialog is being processed, so no priority is acquired.

The main CPU 101 now determines the priority (step S58). In this case, since condition F has been selected, there is no previous priority, so the next priority (p2) is taken as higher, and the dialog in the next text box f-BX is started. The routine for scene box SCN 3 is described next.

Here, the game has progressed, and the processing for scene 3 with N=3 is performed (step S50). Thereupon, in scene 3 as indicated in FIG. 22, a trigger is tripped and the scene box SCN 3 is accessed. In this scene box SCN 3, in this embodiment, are written condition I (p4), jump i, condition J (p2), and jump j.

The main CPU 101 acquires conditions in conjunction with the processing of this scene 3 (step S51).

Next the main CPU 101 compares the acquired conditions against the conditions I and J in the scene box SCN 3 (step S52). In this case we have I=p and J=q. Based on the conditions determined, the main CPU 101 jumps to the text box i-BX when condition I is selected (step S53), and jumps to the text box j-BX when condition J is selected (step S54).

As indicated in FIG. 22, processing routines are executed by the main CPU 101 for the text boxes i-BX and j-BX selected according to the condition. As indicated in FIG. 22, for example, the processing routine for the text box i-BX terminates at the beginning of scene 4, and the routine for the text box j-BX terminates before scene 4.

It is assumed now that condition J, for example, is selected. Thereupon, the main CPU 101 detects whether a dialog is currently being processed. When a dialog is currently being processed, the main CPU 101 acquires the priority of that dialog (step S57). Here, the dialog in the text box f is being processed, so the priority (p2) for condition F is acquired.

The main CPU 101 now determines the priority (step S58). In this case, since condition J has been selected, the priority of the dialog currently being processed is p2. This is the same as the priority p2 of the next dialog, so the dialog (text box f-BX) currently being processed is interrupted, and the dialog in the next text box j-BX is started.

The routine for scene box SCN 4 is described next.

Here, the game has progressed, and the processing for scene 4 with N=4 is performed (step S50). Thereupon, in scene 4 as indicated in FIG. 22, a trigger is tripped and the scene box SCN 4 is accessed. The main CPU 101 acquires conditions in conjunction with the processing of this scene 3 (step S51). Next the main CPU 101 compares the acquired conditions against the conditions K and L in the scene box SCN 4 (step S52). In this case we have K=p and L=q. Based on the conditions determined, the main CPU 101 jumps to the text box k-BX when condition K is selected (step S53), and jumps to the text box 1-BX when condition L is selected (step S54).

The processing routines for the selected text boxes k-BX and 1-BX are now executed with the lengths indicated in FIG. 22. Let it be assumed here that condition K, for example, has been selected. Thereupon, the main CPU 101 detects whether a dialog is currently being processed. If a dialog is currently being processed, the main CPU 101 acquires the priority of that dialog (step S57). Here, no priority is acquired. The main CPU 101 determines the priority (step S58), and, here, the priority of the next dialog (p2) is high, so the dialog in the next text box k-BX is started.

The routine for scene box SCN 5 is described next.

Here, the game has progressed, and the processing for scene 4 with N=4 is continued (step S50). Thereupon, in scene 4 as indicated in FIG. 22, a trigger is tripped and the scene box SCN 5 is accessed. The main CPU 101 acquires conditions in conjunction with the processing of this scene 4 (step S51). Next the main CPU 101 compares the acquired conditions against the conditions M and N in the scene box SCN 4 (step S52). In this case we have M=p and N=q. Based on the conditions determined, the main CPU 101 jumps to the text box m-BX when condition M is selected (step S53), and jumps to the text box n-BX when condition N is selected (step S54).

The processing routines for the selected text boxes m-BX and n-BX are now executed with the lengths indicated in FIG. 22. Let it be assumed here that condition M, for example, has been selected. Thereupon, the main CPU 101 detects whether a dialog is currently being processed. When a dialog is currently being processed, the main CPU 101 acquires the priority (p1) of that dialog (text box k-BX) (step S57). The main CPU 101 determines the priority (step S58), and, here, that priority is the same as the priority (p1) for the next dialog, so the processing of the dialog currently being processed is interrupted, and the dialog in the next text box m-BX is started.

Subsequently, in the same manner, the conditions in the scene box SCN N accessed in correspondence with scenes that are changing as the game develops, together with the conditions provided by the scenes, are determined, and, based on those determinations, text boxes and dialogs are selected.

Figure 23:
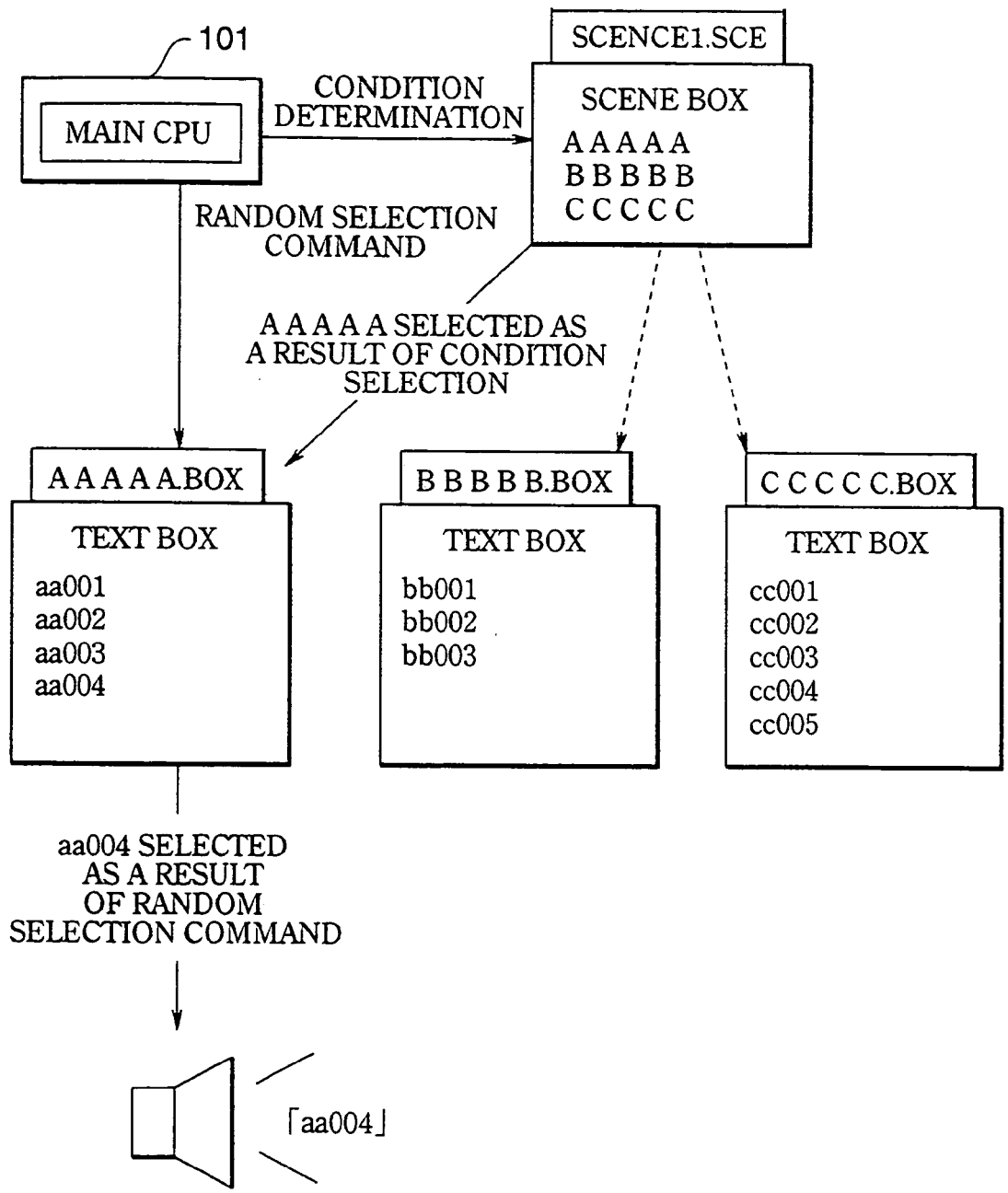
FIG. 23 is a diagram representing the relationship between scene boxes and text boxes in the fourth embodiment of the present invention.

FIG. 23 is a diagram of the relationship between scene boxes and text boxes. In this figure, the main CPU 101 determines conditions "AAAAA," "BBBBB," and "CCCCC" that are written internally in the scene boxes SCN N (where N=1, 2, 3, etc.) provided in conjunction with the development of the game. If the scene is one wherein a pitcher is throwing, for example, condition "AAAAA" might be that "the pitch is made when the pitcher's form is poor," condition "BBBBB" might be that "the opponent team is winning," and condition "CCCCC" might be that "the pitcher has thrown."

In the main CPU 101, moreover, the text box AAAAA-BOX is associated with condition "AAAAA," text box BBBBB-BOX is associated with condition "BBBBB," and text box CCCCC-BOX is associated with condition CCCCC. The main CPU 101 determines the acquired conditions and the conditions in the scene box 1. If condition "AAAAA" has been selected, for example, the main CPU 101 selects the text box AAAAA-BOX based on condition "AAAAA," and then issues a random selection command to the text box AAAAA-BOX, whereupon, based on that random selection command, "aa004," for example, is selected from among the dialog numbers written in the text box AAAAA-BOX, namely "aa001," "aa002," "aa003," and "aa004." The dialog corresponding to this selected dialog number "aa004" is sent to the sound block 12. In this way, the dialog corresponding to "aa004" is played from the speaker 5a.

Here, only the condition names "AAAAA," "BBBBB," and "CCCCC," etc., are written in the scene box SCN 1, these names being the same as the text box names. The content of the text box AAAAA-BOX, moreover, comprises a list of dialog numbers, namely "aa001," "aa002," "aa003," and "aa004," so dialog numbers are not placed in the scene box SCN 1. The content of the text box BBBBB-BOX is also a list of dialog numbers, namely "bb001," "bb002," and "bb003," and no dialog numbers are placed in the scene box SCN 1. The content of the text box CCCCC-BOX is also a list of dialog numbers, namely "cc001," "cc002," "cc003," "cc004," and "cc005," and again no dialog numbers are placed in the scene box SCN 1. The same applies to the other text boxes.

As based on the fourth embodiment of the present invention, conditions determinative of dialog are placed inside the scene boxes, so the time required to debug dialog production routines is shortened, and malfunctions, in the event that they occur, can be disposed of in a short time.

Embodiment S, being a modification of the third embodiment of the present invention, is now described. The background leading up to this modification is first discussed. In order to handle large volumes of dialog data, one approach is to store the data for each dialog in the sectors of a CD-ROM as a single file. However, when each dialog is itself a file, the CPU of the game machine must first access the TOC (the area containing the lead address and file length of all files stored on the CD-ROM), then access the appropriate address (sector), and finally read out data from that sector. As a result, access speed is slow. Because of this, multiple dialog data have been combined into one file and then stored on a CD-ROM, and the lead addresses for the data of each of the dialogs then stored in tabular form in RAM in the main unit.

Further, the accessing of dialog data has been performed using lead addresses stored in RAM. When that is done, however, the end of the dialog data is not known, so the data length has been computed using the lead address of one set of dialog data together with the lead address of the next set of dialog data. As the content of game software used in game machines has become more and more sophisticated, however, the number of dialog data sets has increased dramatically, resulting in enormous volumes of data being stored in main RAM. If, for example, there are 10,000 sets of dialog data and four bytes are required for the lead address of each data set, 40 kilobytes of memory must be used.

Thereupon, what has been done is that lead addresses for each dialog data set have been defined in the program, which resides in main RAM, so that the program can read out the dialog data from CD-ROM whenever needed. In this case, the data length for each dialog data set is needed, but the data format is not a tabular format so the computation cannot be done. For this reason, the lead address of the next dialog data set has been stored in each dialog data storage area on the CD-ROM, making it possible to compute the data lengths. Accordingly, the information held in a dialog data area need not be limited to the lead address of the next dialog data set, but may be the data length of the dialog data.

In the foregoing description, the play-by-play of a baseball game is taken as an example, but the present invention may of course be used in other applications. By making it possible to alter the scene box SCN conditions or text box content, for example, it would also be possible to represent so-called manzai comic routines or play-by-play highlights inserted during a TV program, for example. In any case, the dialogs are selected randomly, and unpredictable developments occur at every turn, so that players do not get bored. Accordingly, it is possible to provide an apparatus and method that afford great variety.

A brief description of a fifth embodiment of the present invention is now given. This fifth invention is intended for the purpose of describing the action of playing back data recorded on CD-ROM, describing different action examples than those described in conjunction with the third embodiment. In this fifth embodiment, specifically, in the leading information in each file, the sector number where the next file begins, which is read-out information, is recorded, so that the sectors for the current file are read out one after the other, and the read operation is terminated when the read out sector number is the sector number where the next file begins.

In this fifth embodiment also, the video game machine diagrammed for the first embodiment in FIGS. 1 and 2, and the hardware for the third embodiment diagrammed in FIG. 14(*a*), are used.

Figure 24:
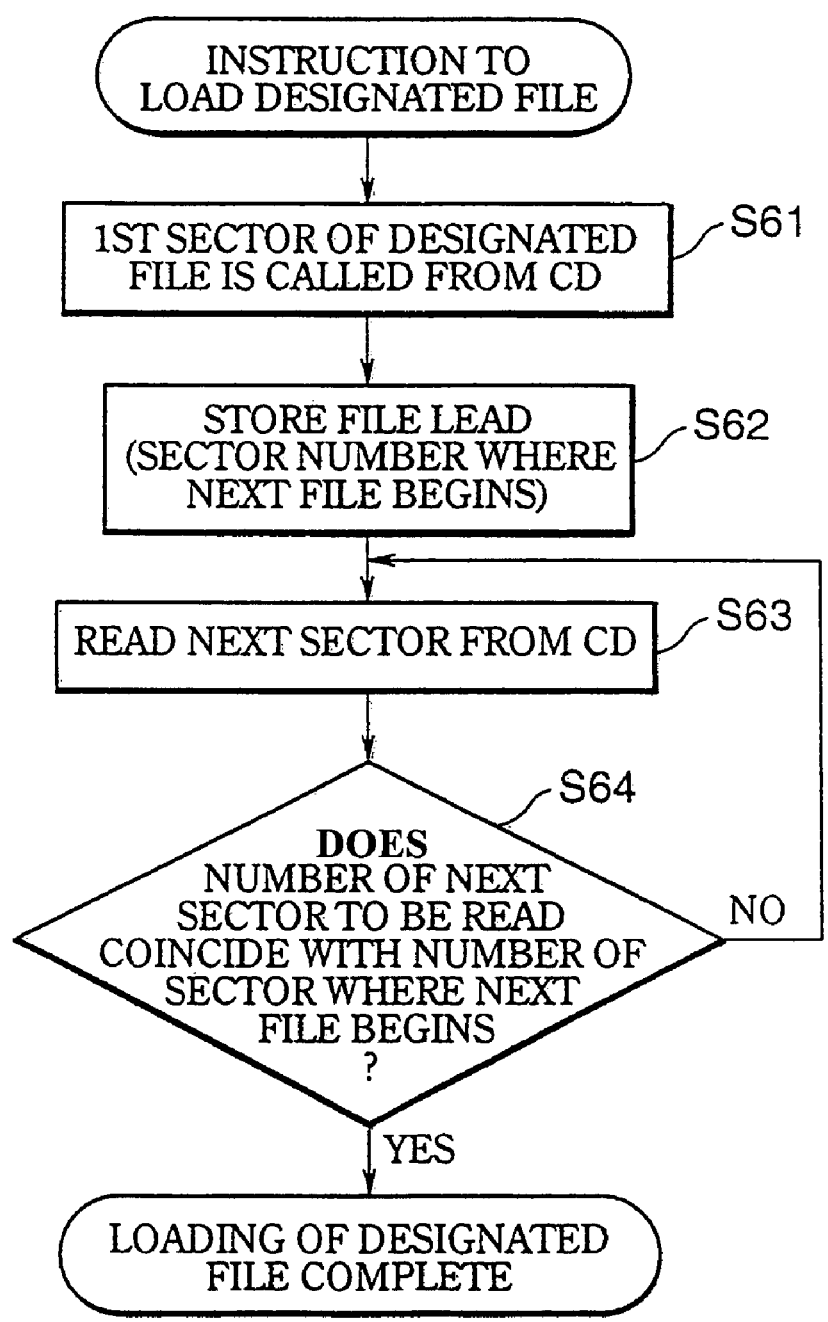
FIG. 24 is a flowchart for describing movement in a fifth embodiment of the present invention.
Figure 25:
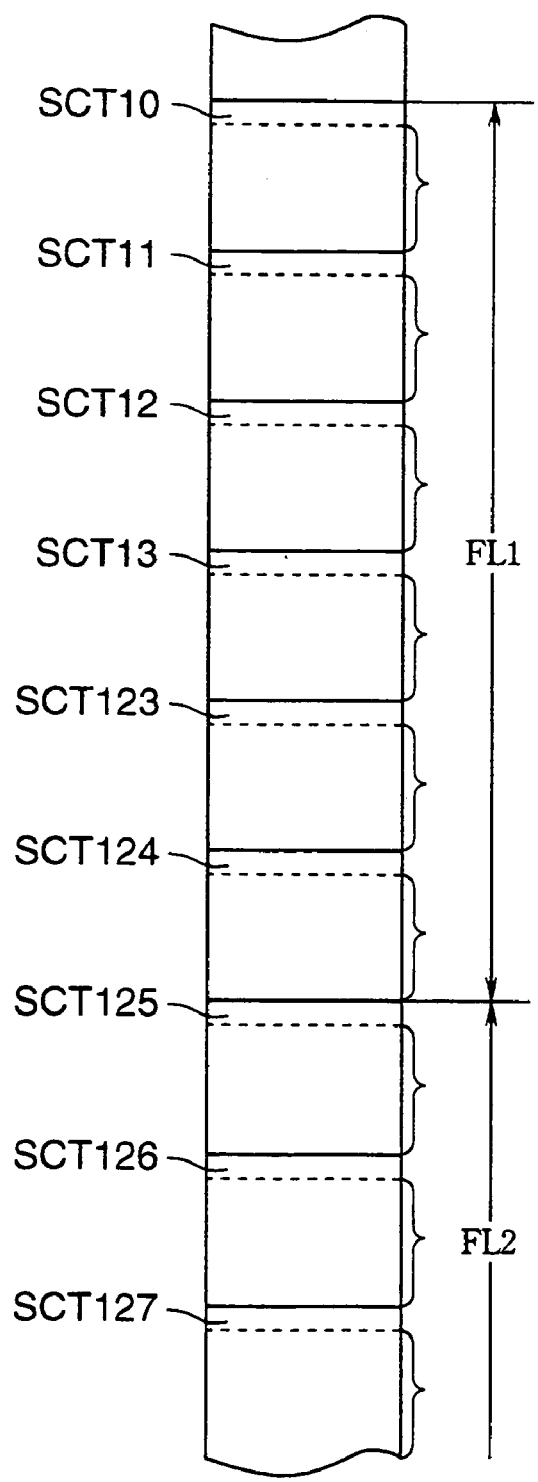
FIG. 25 is a model diagram representing example data recorded in a CD-ROM in the fifth embodiment of the present invention.

We now describe the fifth embodiment using the hardware noted above and FIGS. 24 and 25. FIG. 24 is a flowchart for describing the action of the fifth embodiment, while FIG. 25 is a model diagram representing example data recorded on a CD-ROM.

On the CD-ROM, needless to say, a plurality of files FL1, FL2, etc., are recorded (cf. FIG. 14(*a*)). Similarly, each file, say FL1, as diagrammed in FIG. 25, is made up of a number of sectors ST, ST, etc., according to the length of the information recorded therein.

At the head of each sector ST, ST, etc., making up the file FL1, sector information SCT10, SCT11, SCT13, . . . , SCT124 are provided. And sector information SCT125, SCT126, SCT127, . . . are provided in the sectors ST, ST, etc., making up the next file FL2. In other words, the files FL1, FL2, etc., are made up of pluralities of sectors ST, ST, etc., according to the length of the information which configures them, respectively. Furthermore, the sectors ST, ST, etc., which make up one file FL, besides the sector information SCT noted above, also contain, for example, identifier gaps, data blocks, and data block gaps, and, at the beginning and end of each file FL, predetermined information indicative thereof is provided. Also, in the sector information SCT of the 1st sector ST in each file FL (n), where n is any integer, the 1st sector number for the next file FL (n+1) is recorded.

The flowchart given in FIG. 24 is now explained. To begin with, the file to be read is designated by an instruction from the main CPU 101. This file that is designated to be read is called the designated file. Let it be assumed here that this designated file is the file FL1, for example. Thereupon, the CPU 181 in the subsystem 13 reads out the 1st sector ST of the designated file FL1 from the CD-ROM via the CD-ROM drive 1*b* (step S61). The CPU 181, after executing routines to correct errors in the 1st sector ST information read out, sends the information to the MPEG AUDIO 182 and MPED VIDEO 183. In the AUDIO 182 and MPED VIDEO 183, data from information restored from compressed information is sent to the CPU block 10.

Next, the CPU 181 stores the lead information of the next file obtained in that way (step S62). This stored lead information for the next file, in this case, corresponds to the "sector number (SCT 125 in FIG. 25)" where the next file FL2 begins. Then the CPU 181 reads out the 2nd sector ST of the current file FL1 from the CD-ROM (step S63), and determines whether the sector information SCT12 of the 2nd sector ST read out coincides with the previously noted stored file lead information (SCT125) (step S64).

In this case, the read out sector information is SCT12, which does not coincide with the previously mentioned stored file lead information (SCT125). Accordingly, the CPU 181 judges a non-match (step S64: No), and repeats the routine to read out the sector information SCT13 for the 3rd sector which is next (step S63). Next the CPU 181 determines whether the sector information SCT13 of the 3rd sector ST read out coincides with the previously mentioned stored file lead information (SCT125) (step S64).

In this case, the sector information read out is SCT13, so it does not coincide with the previously mentioned stored file lead information (SCT125). Accordingly, the CPU 181 judges a non-match (step S64: No), and repeats the routine to read out the sector information SCT14 for the 4th sector which is next (step S63). Next the CPU 181 determines whether the sector information SCT14 of the 4th sector ST read out coincides with the previously mentioned stored file lead information (SCT125) (step S64).

In this manner, the CPU 181, when it reads out the sectors ST from the file FL1 one after the other, repeats the comparison with the stored file lead information (SCT125) (step S63 and step S64: No).

In due course, the CPU 181 reads out the 124th sector ST of the current file FL1 from the CD-ROM (step S63). Next the CPU 181 determines whether the sector information SCT124 in the 124th sector ST read out coincides with the previously mentioned stored file lead information (SCT125) (step S64).

In this case, the sector information read out is SCT124, so it does not coincide with the stored file lead information (SCT125). Accordingly, the CPU 181 judges this to be a non-match (step S64: No), and repeats the routine, reading out the sector information SCT125 of the 1st sector in the file FL2 which is next (step S63). Then the CPU 181 determines whether the sector information SCT125 of the 125th sector ST read out coincides with the stored file lead information (SCT125) (step S64).

In this case, the sector information read out is SCT125, so it does coincide with the previously mentioned stored file lead information (SCT125). Accordingly, the CPU 181, judging that the lead information is a match, makes the preceding 124th sector ST the final sector in the designated file FL1, concludes the reading (loading) of the file FL1, and terminates the routine.

In this manner, a file FL (n) is read from the CD-ROM. When this fifth embodiment is implemented, simply by recording the number of the sector wherein the next file FL (n+1) begins in the 1st sector information SCT of the file FL (n), it ceases to be necessary to have complex circuitry for reading the CD-ROM in the subsystem 13, or to provide memory area for storing the data read out in the CPU block 10, and it also becomes unnecessary to have a processing program for appropriately reading out the data stored in such a memory area. These are definite advantages.

Also, when this fifth embodiment is used, there is no need to compute file lengths as in the third embodiment.

A brief description of a sixth embodiment of the present invention is now given. This sixth embodiment, like the fifth embodiment, is provided for describing action for simply playing back data recorded on a CD-ROM, wherewith different example actions will be described than those described in conjunction with the fifth embodiment. Specifically, with this sixth embodiment, the number of sectors (size) of the current file is recorded in the file lead information, the sectors of the current file are read out one after the other from the CD-ROM, and the read operation is terminated when the number of sectors read out coincides with the number of sectors (size) of the current file.

In this sixth embodiment also, the video game machine diagrammed for the first embodiment in FIGS. 1 and 2, and the hardware for the third embodiment diagrammed in FIG. 14(*a*), are used.

Figure 26:
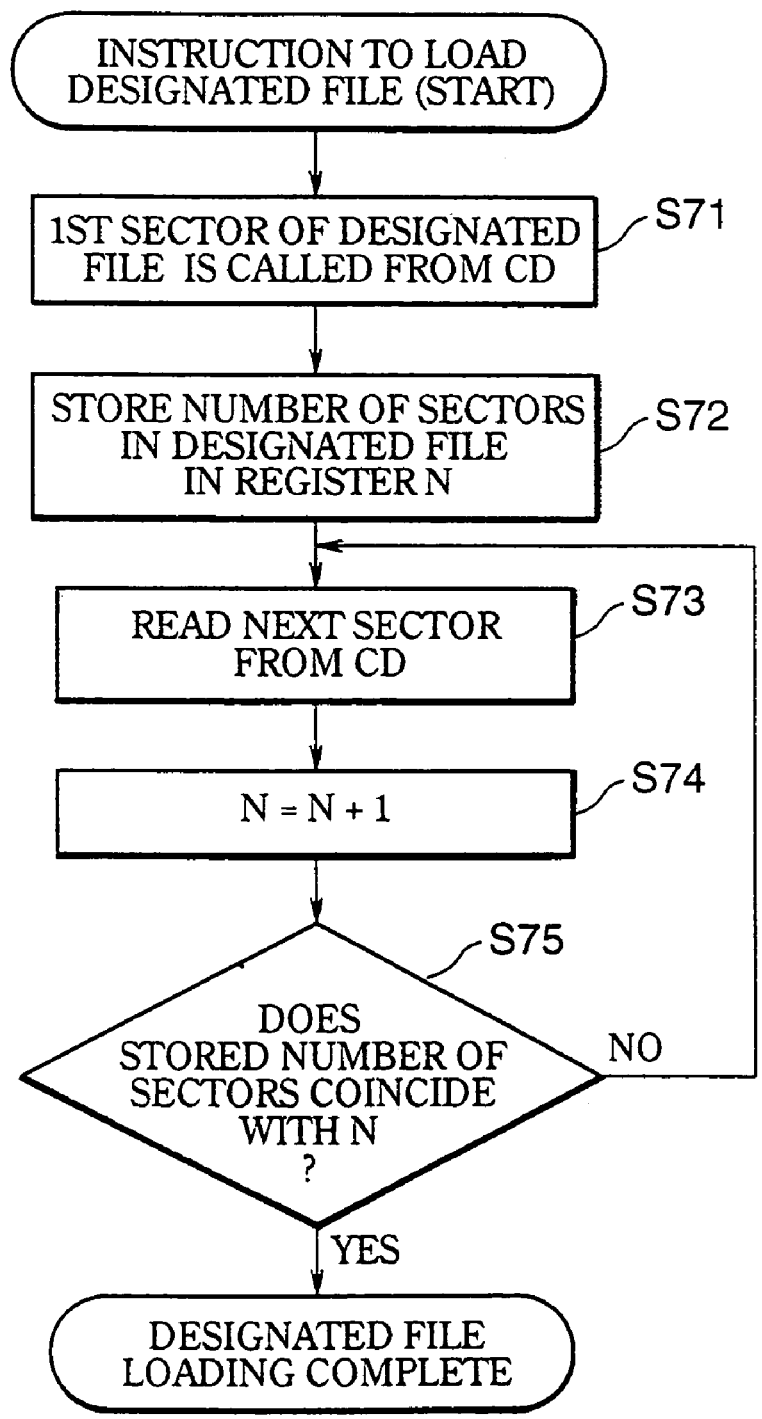
FIG. 26 is a flowchart for describing the action in a sixth embodiment of the present invention.

We now describe the sixth embodiment using the hardware noted above and FIGS. 25 and 26. FIG. 25 is the model diagram used in conjunction with the fifth embodiment, while FIG. 26 is a flowchart for describing the action of the sixth embodiment. The file to be read out is first designated by an instruction from the main CPU 101. Let it be assumed that this designated file is the file FL1, for example. Thereupon, the CPU 181 in the subsystem 13 reads out the 1st sector ST of the designated file FL1 from the CD-ROM via the CD-ROM drive 1*b* (step S71). The CPU 181, after executing routines to correct errors in the 1st sector ST information read out, sends the information to the MPEG AUDIO 182 and MPED VIDEO 183. In the AUDIO 182 and MPED VIDEO 183, data derived from information restored from compressed information is sent to the CPU block 10. Next, the CPU 181 stores the number of sectors making up the current file FL1 obtained in that manner, and sets a "1" in register N (step S72). The number of sectors making up the file FL1 as stored comprises 115 sectors in the case of this sixth embodiment (cf. FIG. 25).

The CPU 181, after reading out the 2nd sector ST for the current file FL1 from the CD-ROM (step S73), increments register N (step S74). In this step S74, before executing the incrementing subroutine, the register N=1. Therefore, upon executing the incrementing subroutine, N=N+1=2.

Next, the CPU 181 compares the number in the register N with the number of files (15) stored as noted above (step S75). In this case, register N=2, and the number of files=115, so the CPU 181 judges this to be a non-match (step S75: No), and, after reading out the 3rd sector ST (step S73), again increments the register N (step S74). In this step S74, before executing the incrementing subroutine, register N=2, so, after executing the incrementing subroutine, N=N+1=3.

Next, the CPU 181 compares the number in the register N with the number of files (15) stored as noted above (step S75). In this case, register N=3, and the number of files=115, so the CPU 181 judges this to be a non-match (step S75: No), and, after reading out the 4th sector ST (step S73), again increments the register N (step S74).

In this manner, the CPU 181 reads out the sectors ST of the file FL1 one after the other, performs an incrementing operation each time it reads out a sector, compares the numerical value in the register N so incremented against the number of sector files (=115) making up the current file FL1 as stored, and repeats the execution of this routine until the numerical value in the register N coincides with the number of sectors (steps S73, S74, and S75: No).

Now, when the CPU 181 has read out the 124th sector ST of the current file FL1 from the CD-ROM (step S73), it increments the register N (step S74). In this step S74, the register N=114 before it is incremented. Therefore, when the incrementing subroutine is executed, N=N+1=115.

Thereupon, when the CPU 181 compares this numerical value in the register N against the number of sectors (=115) comprising the current file FL1 (step S75), the numerical value in the register N coincides with the number of sectors (=115) (step S75: Yes), whereupon the reading (loading) of the designated file FL1 is concluded.

Designated files FL (n) can therefore be read out from the CD-ROM one after another in this manner.

When this sixth embodiment is implemented, merely by recording the number of sectors making up (i.e. the size of) the current file FL (n) in the 1st sector information SCT in the file FL (n), it ceases to be necessary to have complex circuitry for reading the CD-ROM in the subsystem 13, or to provide memory area for storing the data read out in the CPU block 10, and it also becomes unnecessary to have a processing program for appropriately reading out the data stored in such a memory area. These are definite advantages.

Also, when this sixth embodiment is used, there is no need to compute file lengths as in the third embodiment.

In this sixth embodiment, as described above, when the designated file FL (n) is read out, the 1st sector information SCT of that designated file FL (n) is read out and the number of sectors making up that current file FL (n) is stored, an incrementing operation is performed each time a sector configuring the file FL (n) is read out, and it is determined that the entire current file FL (n) has been read out when the number of sectors stored is matched. Alternatively, however, this embodiment may be made so that the number of sectors in the designated file FL (n) is decremented each time a sector is read out, so that it is determined that the reading out of the current file FL (n) be concluded when the number becomes zero.

In other words, with the sixth embodiment, the number of sectors making up (i.e. the size of) the file FL (n) is read out, and, looking at this number of sectors in (size of) this file FL (n), any remaining portion therein continues to be read out from the CD-ROM.

In addition, in the third, fifth, and sixth embodiments, as described in the foregoing, read-out information (that is, information pertaining to the next file, or the number of sectors configuring the current file, etc.) is placed in the lead sector of the file (designated file) that is to be read out. This does not constitute a limitation, however, and such information might instead be placed in the 2nd or 3rd sector, and the reading out controlled in that configuration. In such cases, with the current read-out information in the 2nd or 3rd sector, one need only also store the sector or sectors in front thereof, and thus complete the file.

A brief description of a seventh embodiment of the present invention is now given. This seventh embodiment is a system that can verify a spoken password, thereby making the password verification operation easy. This TV game machine uses passwords to restrict those who may play the game to certain persons, or, alternatively, it involves the necessity of setting a password in conjunction with the progress of the game. This seventh embodiment is a system that, in addition to designating a password one character or letter at a time when it is entered or output, makes it possible to verify the characters being designated by audio.

The processing routine for password entry is first described. In this seventh embodiment also the TV game machine used in the first embodiment is used.

Figure 27:
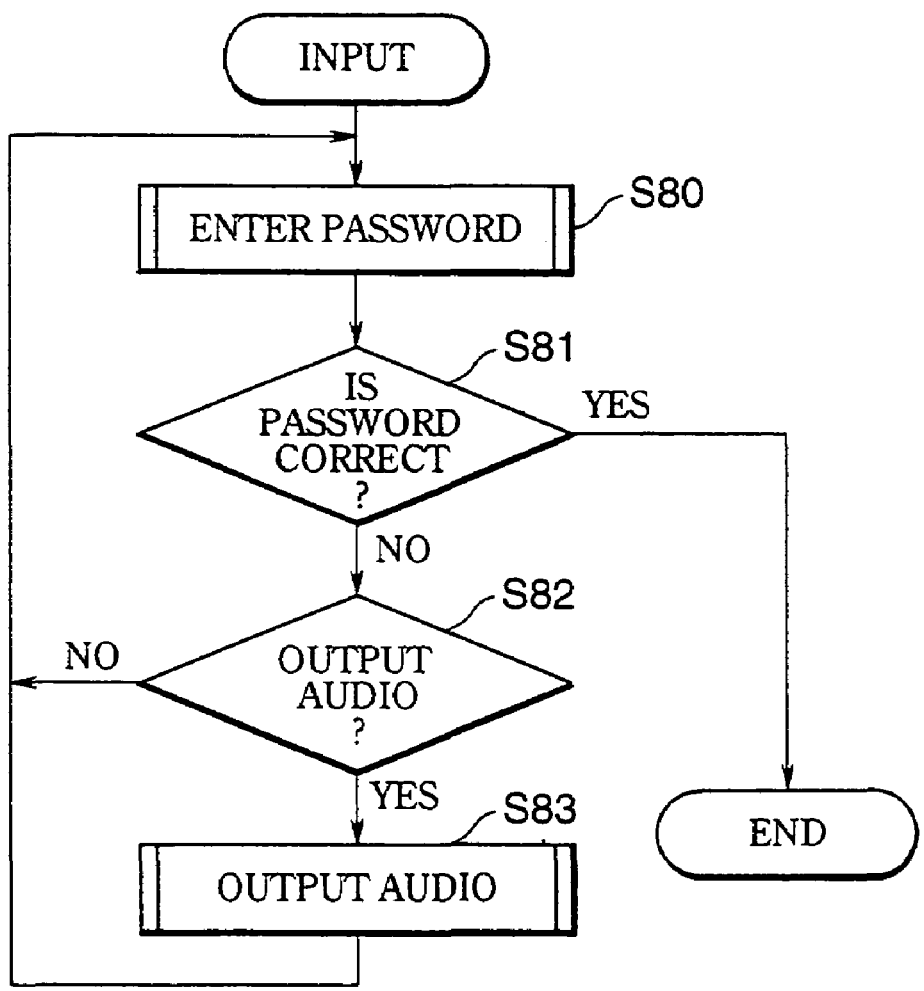
FIG. 27 is a flowchart for describing the action involved when a password is input in a seventh embodiment of the present invention.

In this seventh embodiment, the processing routine for password entry is first described with reference to FIG. 27. FIG. 27 is a flowchart that describes the action performed when entering a password.

As soon as the password entry mode is initiated, the action routine in the flowchart in FIG. 27 is moved to. In FIG. 27, to begin with, instructions displayed on the screen of the TV receiver 5 are followed to bring up a password entry screen. Then the password is entered (step S80), whereupon the entered password is displayed on the screen. Ordinarily, the password displayed on the screen of the TV receiver 5 is verified one character at a time, and, when it is judged that the password has been correctly entered (step S81: Yes), the routine ends. However, this operation of verifying a password while viewing the screen of the TV receiver 5 is difficult. Thereupon, when the system is set to make audio output (step S82: Yes), every time a character in the password is entered, that character is output as audio from the speakers 5a and 5b (step S83).

Accordingly, in this seventh embodiment, every time a password is entered, the characters entered are output as audio. Therefore, by executing this process until the correct password is entered (steps S81 through S84), the characters can be verified by audio, making the verification operation easier.

Figure 28:
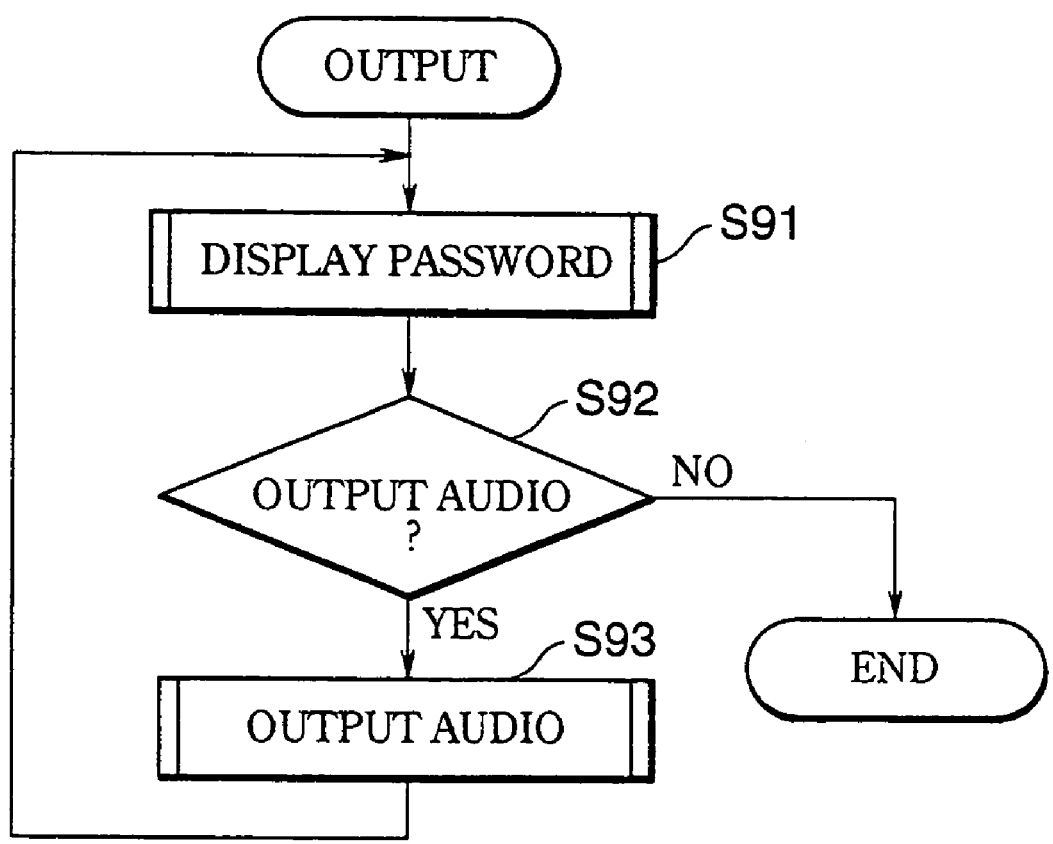
FIG. 28 is a flowchart for describing the action involved when a password is output in a seventh embodiment of the present invention.

The processing routine for password output in this seventh embodiment is now described with reference to FIG. 28. FIG. 28 is a flowchart for describing the action when a password is output.

In FIG. 28, directions displayed on the screen of the TV receiver 5 are followed to bring up a password output screen. Predetermined procedures are followed to bring up the password output screen. When this is done, a password will be displayed on the screen of the TV receiver 5 (step S91).

Thereupon, as soon as a determination has been made on whether to output by audio or not (step S92), if no audio output is to be made (step S92: No), for example, the routine ends. If an audio output is to be made (step S92: Yes), however, an audio output is made according to the characters making up the password (step S93).

Figure 29:
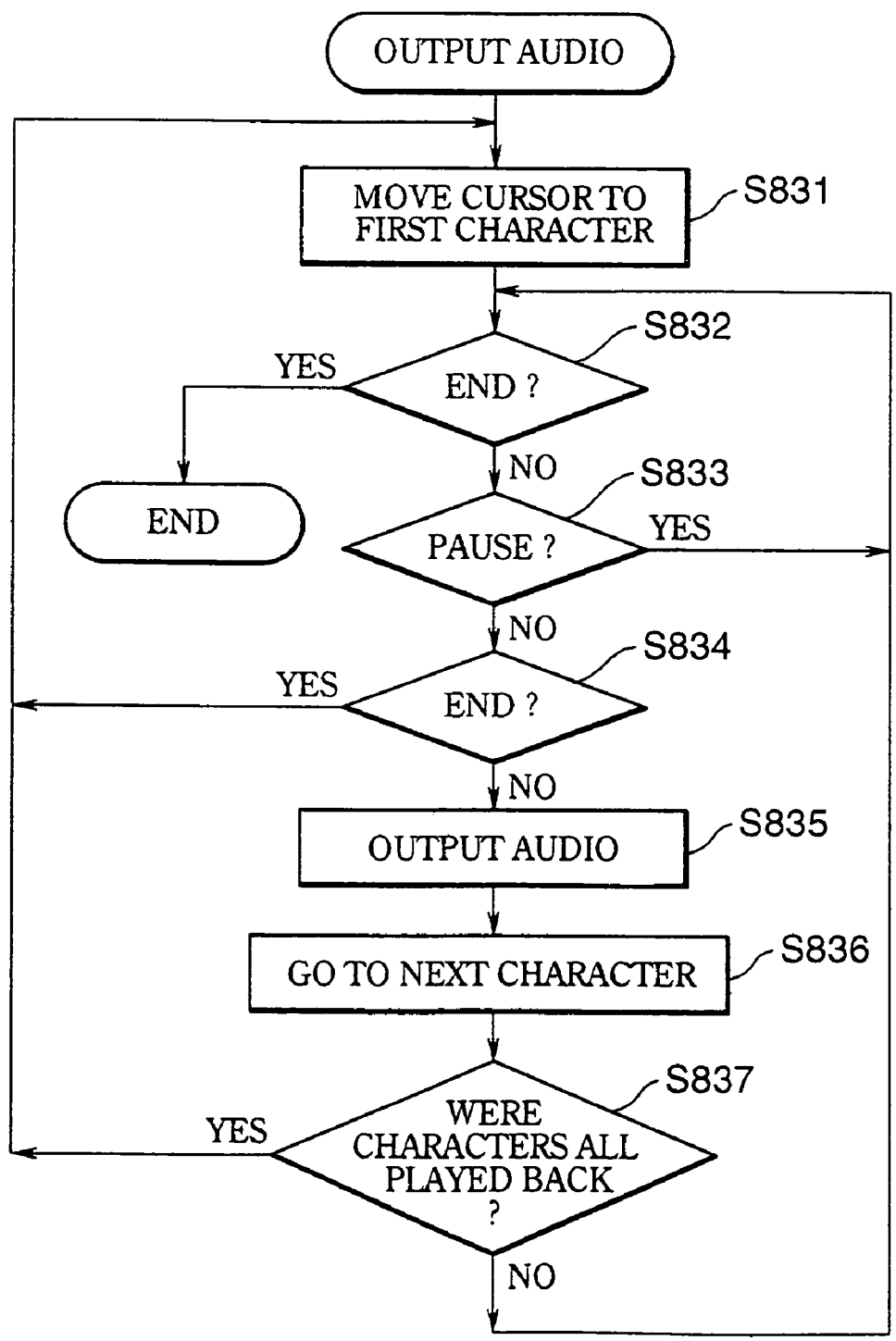
FIG. 29 is a flowchart of an audio output processing subroutine in the seventh embodiment of the present invention.

FIG. 29 is a flowchart of a subroutine for executing the audio output processing (step S83). The audio output processing (step S83) in FIG. 27, or, alternatively, the audio output subroutine (step S93) in FIG. 28, will be executed by the main CPU 101. First, the cursor is moved to the first character (step S831).

Next, a decision is made as to whether or not to terminate processing (step S832). If processing is not to be terminated (step S832: No), then a decision is made as to whether or not to pause (step S833). This processing is for the purpose of playing back the audio with the predetermined timing. If no pause is to be implemented (step S833: No), then a decision is made on whether or not to end (step S834).

If the decision is not to end (step S834: No), audio output processing is executed (step S835). Then the cursor is moved to the next character (step S836).

A decision is next made on whether or not the final character configuring the password has been played back (step S837). When the final character in the password has not been played back (step S837: No), the routine is again executed from step S832.

When, on the other hand, the final character in the password has been played back (step S837: Yes), the subroutine for moving the cursor to the first character is jumped to (step S841). If the processing is to be stopped (step S832: Yes), it is stopped.

When a pause is initiated (step S833: Yes), the routine is again executed from step S832.

When processing is to be terminated (step S834: Yes), step S831 is returned to, and the subroutine is executed to move the cursor to the first character.

Thus audio output processing is executed in the same manner whenever audio output is selected, either when inputting or outputting a password. This audio output processing routine moves the cursor in conjunction with characters making up the password. Alternatively, however, this may be done by changing the color of a character to one different from the color of the other characters. As may be readily understood from the flowchart, moreover, this audio output processing routine can perform audio outputs, pause, stop, play back again, and move the cursor responsively. Also, since this audio output routine can execute in single character units, it is effective for password verification.

This seventh embodiment thus provides the following features.

(1) Passwords can be played back, paused, or stopped, character by character, with any desired timing.
(2) An audio stop function is provided, so that, even when a mistake is made and the audio is played back, the mistake can still be cancelled.
(3) The cursor moves on the screen in conjunction with the audio output, so when the next replay is made, even during an audio pause, a player will know where the audio output is starting from.
(4) By adding the pause function, a password can be verified at a player's own pace.
(5) Whether or not to implement audio output is left up to the player, so the function need not be used if it is not needed.
(6) If a player fails to hear the password, by asking for a replay, the audio output will be repeated.
(7) The audio is output with breaks at intervals to make it easy to hear.
(8) A player may use this function to verify a password he or she has entered.

With this seventh embodiment, therefore, there is no necessity of moving one's eyes back and forth between the screen and a piece of paper, so eye strain is lessened.

With the seventh embodiment, verification can be made by audio, thus facilitating discovery of erroneous entries of readily mistaken passwords.

By implementing the seventh embodiment, pre-game nervousness is reduced.

By implementing the seventh embodiment, the burden on a player is reduced when entering a rather long password.

By implementing the seventh embodiment, it is possible to make using the game very enjoyable in every detail.

The other embodiments are media on which programs are recorded for making a computer function as a processing unit and data system.

These media include, for example, floppy disks, hard disks, magnetic tape, magneto-optical disks, CD-ROMs, DVDs, ROM cartridges, battery-backed-up RAM memory cartridges, flash memory cartridges, and non-volatile RAM cards, etc. Also included are land-wire communications media such as telephone lines and wireless communications media such as microwave channels. The internet is also comprehended among the communications media here in view.

By media, moreover, are meant anything wherewith information (mainly digital data and programs) is recorded by some physical means or other, and wherewith a processing device such as a computer or dedicated processor can be made to perform the predetermined functions. In other words, the medium need only be such as wherewith programs can be downloaded to a computer, by some means or other, and whereby the computer can be made to perform the predetermined functions.

The benefits of the present invention are now discussed. When the present invention, as set forth in the foregoing, is employed, polygons configuring game characters can be arranged with only a few computations, so that the computation processing steps can be reduced. Furthermore, no parts corresponding to articulations exist between the torso polygon or other reference polygon, on the one hand, and component polygons for wrists and ankles, etc., on the other, wherefore the component polygons can be freely extended and contracted. Also, when the second aspect of the present invention is employed, the parts configuring facial expressions in a game character are made up of multiple component polygons provided, respectively, with position data referenced from a reference point, and, when an expression is being changed, the polygons for the parts such as the eyes, nose, and mouth, corresponding to the change in expression, are image-processed, so each component polygon can be subjected to image processing independently. Thus the image-processing burden is lessened, and the game character's face, which is the reference for expressions, is not affected by changes in the parts, so the outline thereof will not break down even when radical expressions are effected.

Also, when the second aspect of the present invention is employed, components can be rotated, enlarged, reduced, and moved, even with a single texture pattern, so that colorful expressions can be made just with that. If the number of texture patterns is increased, moreover, expressions can be effected which are far more colorful than with conventional texture pattern changing and model changing. Component polygons can also be made to jump out from or drop down from the face that is the reference, thus making possible the representation of colorful animation-like expressions.

Furthermore, when the third aspect of the present invention is employed, read-out information pertaining to the next file is written into a predetermined sector in each current file, and that current file is read out by a processing unit based on the read-out information written to the predetermined sector. Therefore the main memory can be used efficiently, holding almost no read-out information therein.

Furthermore, when the fourth aspect of the present invention is employed, when a predetermined situation is in effect, scene boxes are provided wherein are written various scene conditions conceivable for that situation, and text boxes are provided wherein are written the numbers of dialogs suitable to those scenes, corresponding to the conditions in the scene boxes, respectively. The developing situations in the game are monitored, predetermined conditions are acquired, scene box condition decisions are made with those conditions, corresponding text boxes are selected, dialog numbers are selected by random selection commands for the text boxes, and those numbers are sent to an audio output device. Thus the time required for debugging dialog production routines is shortened, and malfunctions, when they occur, can be disposed of in a short time.

In addition, a fifth aspect of the present invention is devised such that, as character strings including characters, numbers, and symbols, etc., are displayed on display means, an audio signal for each of the characters making up the character string is sent to the sound playback means and speech is produced, making it easy to discover mistakes in displayed character strings and input errors when entering character strings. Moreover, an input character string can be verified promptly, so pre-game nervousness can be lessened, the burden on the player when entering a rather long character string can be reduced, and using the game can be made enjoyable in every particular.

What is claimed is:

1. A data processing apparatus for positioning a game character on a display, said apparatus comprising:
   a game character model, including a reference polygon and component polygons that are separated from the reference polygon, wherein no other polygons are included between said reference polygon and said component polygons;
   a motion data table for pre-storing motion data for executing a movement of the game character model, wherein motion data includes distance data and angle data defining predetermined motions of the game character model, and wherein the motion data is character data including a joint area; and
   a processor, wherein the processor computes the reference polygon at each of a plurality of trigger times corresponding to an occurrence of a predetermined scene based on a position information of said reference polygon and the motion data, places the reference polygon in a three-dimensional space, and directly places said component polygons for said reference polygon in the three-dimensional space based on the position information of said reference polygon using the motion data without computing any other component polygons.

2. A data processing apparatus of claim 1, wherein said process alienates said component polygons from said reference polygons.

3. A data processing apparatus of claim 1, wherein the motion data includes articulating components for the movement of the game character mode.

4. A data processing apparatus of claim 1, wherein said game character further comprises:
   a plurality of reference polygons.

5. A data processing apparatus for positioning a human game character on a display, said apparatus comprising:
   a human game character model, including a reference polygon and component polygons that are separated from the reference polygon, wherein no other polygons are included between said reference polygon and said component polygons;

a motion data table for pre-storing motion data for executing a motion for a movement of the human game character model, wherein motion data includes distance data and angle data defining predetermined motions of the human game character model, and wherein the motion data is character data including a joint area; and a processor, wherein the processor computes the reference polygon at each of a plurality of trigger times corresponding to an occurrence of a predetermined scene based on the motion data, and directly places component polygons for said reference polygon based on the motion data without computing any other component polygons.

6. A medium on which is stored a program for causing a computer to function as a processor and data system cited in any one of claims 1 through 5.

7. A data processing apparatus of claim 6, wherein the motion data includes articulating components for the movement of the game character model.

8. A data processing apparatus of claim 6, wherein said human game character further comprises:

a plurality of reference polygons.

* * * * *

UNITED STATES PATENT AND TRADEMARK OFFICE
CERTIFICATE OF CORRECTION

PATENT NO. : 7,030,882 B1
APPLICATION NO. : 09/135024
DATED : April 18, 2006
INVENTOR(S) : Maki Kato et al.

It is certified that error appears in the above-identified patent and that said Letters Patent is hereby corrected as shown below:

In claim 6, column 30, line 5, "claims 1 through 5." should read --claims 1, 2, or 5.--.

In claim 7, column 30, line 6, "claim 6," should read --claim 5,--.

In claim 8, column 30, line 9, "claim 6," should read --claim 5,--.

Signed and Sealed this

Nineteenth Day of August, 2008

JON W. DUDAS
*Director of the United States Patent and Trademark Office*